(12) United States Patent
Anezaki et al.

(10) Patent No.: US 8,908,217 B2
(45) Date of Patent: Dec. 9, 2014

(54) INFORMATION PROCESSING TERMINAL, INFORMATION PROCESSING DEVICE, INFORMATION PROCESSING SYSTEM, AND RECORDING MEDIUM

(71) Applicant: Konica Minolta, Inc., Chiyoda-ku (JP)

(72) Inventors: Kazuya Anezaki, Kobe (JP); Junichi Hase, Osaka (JP); Kenji Matsuhara, Kawanishi (JP); Kazusei Takahashi, Nishinomiya (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/182,700

(22) Filed: Feb. 18, 2014

(65) Prior Publication Data

US 2014/0233060 A1    Aug. 21, 2014

(30) Foreign Application Priority Data

Feb. 18, 2013  (JP) .................................. 2013-028706

(51) Int. Cl.
 *G06F 3/12* (2006.01)
 *G06F 15/00* (2006.01)
(52) U.S. Cl.
 CPC ............ *G06F 3/1258* (2013.01); *G06F 3/1288* (2013.01); *G06F 3/1292* (2013.01)
 USPC ........................... 358/1.15; 358/1.13; 358/1.1
(58) Field of Classification Search
 USPC ............ 358/1.1, 1.4, 1.5, 1.6, 1.9, 1.11, 1.12, 358/1.13, 1.14, 1.15, 1.16, 1.17, 1.18
 See application file for complete search history.

(56) References Cited

U.S. PATENT DOCUMENTS

2003/0069038 A1  4/2003  Takamine et al.
2003/0214666 A1  11/2003  Osada
2005/0046887 A1  3/2005  Shibata et al.

FOREIGN PATENT DOCUMENTS

JP   2003-224893 A   8/2003
JP   2005-080019 A   3/2005
JP   2007-035049 A   2/2007

*Primary Examiner* — Thierry L Pham
(74) *Attorney, Agent, or Firm* — Buchanan Ingersoll & Rooney PC

(57) ABSTRACT

An information processing terminal capable of communicating with an information processing device with an operational panel on which setting on a job and an order to execute the job are accepted. The information processing terminal includes: a display unit; an operational input unit; a remote controller to remote control the information processing device by acquiring an operational screen and displaying the operational screen, and by transmitting operational information to the information processing device; a terminal function controller to control a specific function mounted on the information processing terminal; and a storage storing a program that functions as a cooperation controller to make the information processing device and the terminal function controller work cooperatively. The remote controller actuates the cooperation controller by starting the program and displays the cooperation operational screen. The cooperation operational screen is used for making the information processing device and the terminal function controller work cooperatively.

13 Claims, 17 Drawing Sheets

INFORMATION PROCESSING TERMINAL, INFORMATION PROCESSING DEVICE, INFORMATION PROCESSING SYSTEM, AND RECORDING MEDIUM

This application is based on the application No. 2013-028706 filed in Japan, the contents of which are hereby incorporated by reference.

BACKGROUND OF THE INVENTION

1. Field of the Invention

The present invention relates to a technique that allows remote operation of an information processing device such as an MFP from an information processing terminal such as a tablet terminal or a smartphone.

2. Description of the Background Art

An information processing device called for example an MFP (multi-function peripheral) having a printing function and a scanning function is generally used on a network and can transmit and receive various types of data such as document data. As an example, this information processing device can transmit image data generated by reading of the scanning function to a server through a network.

The action of the information processing device having the aforementioned communication function can be controlled in response not only to user's direct operation on an operational panel provided to the information processing device but also to remote control exerted by operation through a network using this communication function. As an example, Japanese Patent Application Laid-Open No. 2003-224893 discloses a technique relating to such an information processing device.

Japanese Patent Application Laid-Open No. 2003-224893 discloses a technique implemented in a system where a mobile phone and a printer can communicate with each other. According to this technique, if communication between the mobile phone and the printer is established, the printer transmits a function changing program stored in a storage of the printer to the mobile phone. Japanese Patent Application Laid-Open No. 2003-224893 further discloses a technique of making the printer and the mobile phone work cooperatively in the following way. The mobile phone stores the received function changing program into a storage of the mobile phone and then starts the program. If the mobile phone receives an order to change a function input by a user, it becomes functional as a pointing device for the printer.

Information processing terminals such as tablet terminals and smartphones have spread remarkably in recent years. Such an information processing terminal may be used as a terminal for remote control of the action of an information processing device. The function of this information processing terminal is realized by an application. Accordingly, the aforementioned remote control is generally considered to be realized by an application for remote control.

The application for remote control may be an independent application such as an application for shooting or an application for electronic mails not having capability to work in cooperation with an application to realize a different function. This makes a user feel inconvenience who hopes to achieve an intended object by using a remote control function and a different function.

As an example, in order to make an information processing device print an image shot by using an application for shooting, a user should perform the following process. The user starts the application for shooting, displays an operational screen dedicated to shooting on a display unit, and shoots an image. Then, the user stores the shot image once in a certain storage area. The user thereafter starts an application for remote control and displays an operational screen dedicated to remote control on the display unit, thereby switching an application to run in the foreground from the application for shooting to the application for remote control. Then, the user reads the shot image from the storage area, transmits the shot image to the information processing device, and makes the information processing device print the shot image.

As described above, if the application for remote control is an independent application not having capability to work in cooperation with an application to realize a different function, a user encounters the problem of having to perform complicated operations such as switching of an operational screen dedicated to each application, and storage and read of an image.

Japanese Patent Application Laid-Open No. 2005-80019 discloses an external API (application program interface) unit provided in an information processing device with the intention of expanding the function of the information processing device easily while suppressing change of an existing application. Japanese Patent Application Laid-Open No. 2005-80019 recites that the external API unit has the function of accepting XML data indicating a request for image process from an external PC, the function of converting the accepted data to a command responsive to an API of a control layer in the information processing device, and the function of transferring the command to an application of the control layer or an application layer in the information processing device.

Japanese Patent Application Laid-Open No. 2007-35049 discloses an image forming device including a real-time OS responsible for control of the entire device and a virtual machine to implement a specific application. Japanese Patent Application Laid-Open No. 2007-35049 recites that an application of the virtual machine calls up an API of the real-time OS through an API that can be interpreted by the virtual machine to control a controller that controls a reader unit or a printer unit, for example.

The techniques disclosed in Japanese Patent Application Laid-Open Nos. 2005-80019 and 2007-35049 are intended to enhance the expandability of the function of an information processing device or to enhance the efficiency in development of a program, so that they do not solve the aforementioned problem.

SUMMARY OF THE INVENTION

The present invention has been made in view of the aforementioned problem. It is an object of the present invention to provide an information processing terminal, an information processing device, an information processing system, and a recording medium capable of reducing work to a minimum to be done by a user who intends to achieve a desirable object by using a remote control function and a different function, thereby enhancing convenience of the user.

In order to achieve this object, the present invention is first intended for an information processing terminal capable of communicating with an information processing device with an operational panel on which setting on a job and an order to execute the job are accepted. According to one aspect of this invention, the information processing terminal includes: a display unit on which various types of information are displayed; an operational input unit to accept user's operation; a remote controller to remote control the information processing device by acquiring an operational screen displayed on the operational panel from the information processing device and displaying the operational screen on the display unit, and by transmitting operational information resulting from user's operation to the information processing device while the operational screen is displayed on the display unit; a terminal function controller to control a specific function mounted on the information processing terminal; and a storage storing a program that functions as a cooperation controller to make the information processing device and the terminal function controller work cooperatively. The remote controller actuates the cooperation controller by starting the program based on user's operation on the operational input unit. In response to acquisition of a cooperation operational screen from the cooperation controller, the remote controller displays the cooperation operational screen on at least part of the display unit. The cooperation operational screen is used for making the information processing device and the terminal function controller work cooperatively.

Second, the present invention is intended for an information processing device capable of communicating with an information processing terminal. According to one aspect of this invention, the information processing device includes: an image processor to execute a job relating to image process; an operational panel on which an operational screen relating to setting on a job to be executed by the image processor is displayed and on which manual input by a user is accepted; a remote operation accepting unit to transmit an operational screen displayed on the operational panel to the information processing terminal based on a request for a screen received from the information processing terminal, make setting on a job in response to receipt of operational information indicating operation on the operational screen from the information processing terminal, and update the operational screen to be transmitted to the information processing terminal; and a program execution unit to function as a cooperation controller. The cooperation controller becomes functional to make a specific function and the image processor work cooperatively by starting a program when the program is received from the information processing terminal. The program is used for controlling the specific function mounted on the information processing terminal. The cooperation controller generates a cooperation operational screen on which the specific function is operated and transmits the cooperation operational screen to the information processing terminal. In response to receipt of operational information indicating operation on the cooperation operational screen from the information processing terminal, the cooperation controller starts the specific function in the information processing terminal.

Third, the present invention is intended for an information processing system including an information processing device and an information processing terminal capable of communicating with the information processing device. The information processing device includes an operational panel on which setting on a job and an order to execute the job are accepted. According to one aspect of this invention, the information processing terminal of the information processing system includes: a display unit on which various types of information are displayed; an operational input unit to accept user's operation; a remote controller to remote control the information processing device by acquiring an operational screen displayed on the operational panel from the information processing device and displaying the operational screen on the display unit, and by transmitting operational information resulting from user's operation to the information processing device while the operational screen is displayed on the display unit; a terminal function controller to control a specific function mounted on the information processing terminal; and a storage storing a program that functions as a cooperation controller to make the information processing device and the terminal function controller work cooperatively. The remote controller transmits the program to the information processing device based on user's operation on the operational input unit. The information processing device actuates the cooperation controller by starting the program in response to receipt of the program from the information processing terminal. The cooperation controller generates a cooperation operational screen and transmits the cooperation operational screen to the information processing terminal. In response to receipt of operational information indicating operation on the cooperation operational screen from the information processing terminal, the cooperation controller transmits an order to the information processing terminal to start the specific function in the information processing terminal. The cooperation operational screen is used for making the information processing device and the terminal function controller work cooperatively. The terminal function controller starts the specific function in the information processing terminal based on the order transmitted from the cooperation controller.

Fourth, the present invention is intended for a non-transitory computer-readable recording medium storing a control program to bring an information processing terminal into operation. The information processing terminal is capable of communicating with an information processing device with an operational panel on which setting on a job and an order to execute the job are accepted. The information processing terminal includes a display unit on which various types of information are displayed, an operational input unit to accept user's operation, and a storage storing a cooperation program. According to one aspect of this invention, the control program makes the information processing terminal function as: a remote controller to remote control the information processing device by acquiring an operational screen displayed on the operational panel from the information processing device and displaying the operational screen on the display unit, and by transmitting operational information resulting from user's operation to the information processing device while the operational screen is displayed on the display unit; and a terminal function controller to control a specific function mounted on the information processing terminal. The remote controller actuates a cooperation controller by starting the cooperation program stored in the storage based on user's operation on the operational input unit. In response to acquisition of a cooperation operational screen from the cooperation controller, the remote controller displays the cooperation operational screen on at least part of the display unit. The cooperation program functions as the cooperation controller to make the information processing device and the terminal function controller work cooperatively. The cooperation operational screen is used for making the information processing device and the terminal function controller work cooperatively.

Fifth, the present invention is intended for a computer-readable recording medium storing a control program to bring an information processing device into operation. The information processing device is capable of communicating with an information processing terminal and including an operational panel on which an operational screen relating to setting on a job is displayed and on which manual input by a user is accepted. According to one aspect of this invention, the control program makes the information processing device function as: an image processor to execute a job relating to image process; a remote operation accepting unit to transmit an operational screen displayed on the operational panel to the information processing terminal based on a request for a screen received from the information processing terminal, make setting on a job in response to receipt of operational information indicating operation on the operational screen from the information processing terminal, and update the operational screen to be transmitted to the information processing terminal; and a program execution unit to function as a cooperation controller. The cooperation controller becomes functional to start a specific function by starting a cooperation program when the cooperation program is received from the information processing terminal. The cooperation program is used for controlling the specific function mounted on the information processing terminal.

DESCRIPTION OF THE PREFERRED EMBODIMENTS

Preferred embodiments of the present invention will be described in detail below. Components common to the preferred embodiments are identified by the same reference numbers, and will not be discussed repeatedly for the same description.

Figure 1:
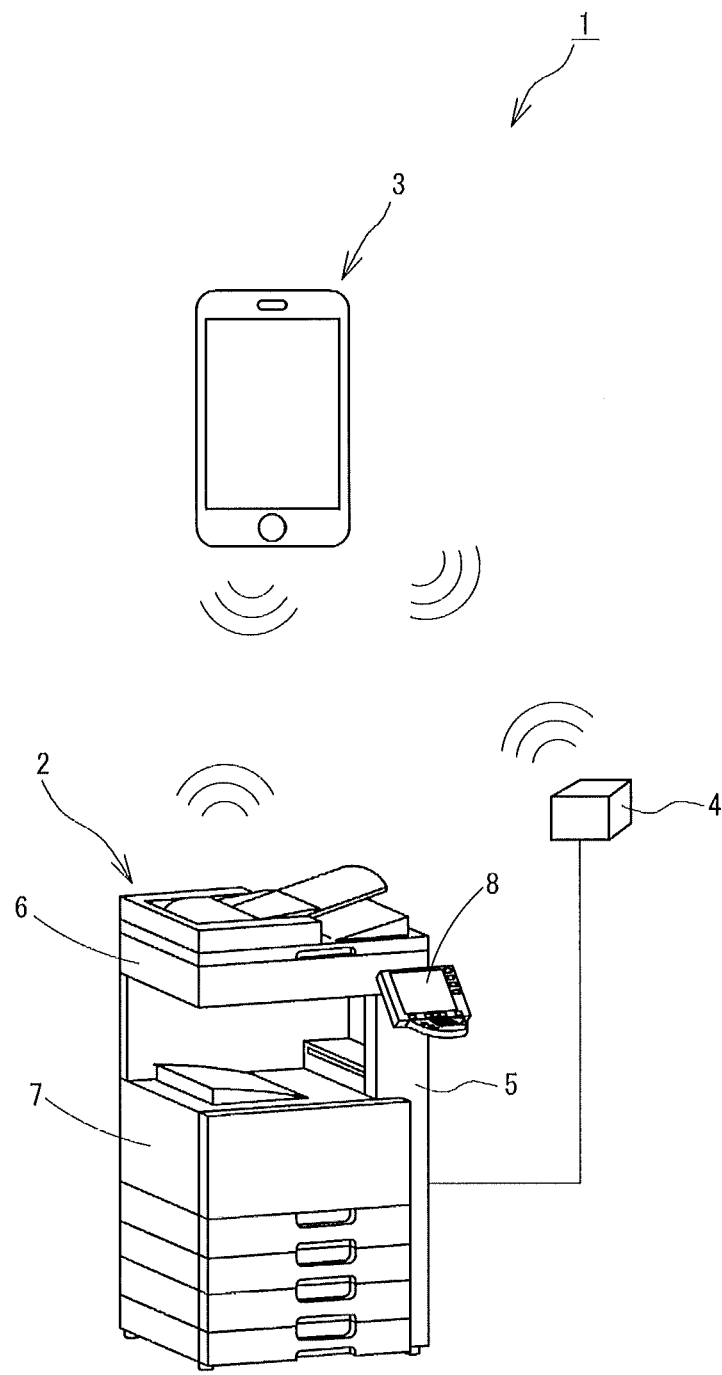
FIG. 1 is a conceptual view showing an exemplary structure of an information processing system of a first preferred embodiment.

FIG. 1 is a conceptual view showing an exemplary structure of an information processing system 1 of a first preferred embodiment.

The information processing system 1 of FIG. 1 includes an information processing device 2 composed for example of an MFP and an information processing terminal 3 used by a user that can communicate with each other. The information processing device 2 and the information processing terminal 3 may make communication via an access point 4 through a network such as a LAN (local area network) or a wide area network including the Internet. The information processing device 2 and the information processing terminal 3 may also make communication based on the IrDA (Infrared Data Association) specifying standards for infrared communication or short-range radio communication using a radio wave or an electromagnetic field, for example. The first preferred embodiment is described on condition that the information processing device 2 and the information processing terminal 3 make the former network communication.

The information processing device 2 has the function of making data communication through network communication and additionally, has multiple functions including a scanning function, a printing function, a copying function, and a BOX function. The scanning function is to read a document by driving an image reading unit 6 arranged for example in upper part of a body 5 of the information processing device 2, thereby generating image data. The printing function is to make a print output by driving an image forming unit 7 arranged for example in central part of the body 5 of the information processing device 2. The copying function is to output a copy of a document by implementing the scanning and printing functions cooperatively. The BOX function is to store various types of data in a storage area (BOX) described later provided in the information processing device 2. Examples of data to be stored by the BOX function include image data obtained by reading by the scanning function and data received through network communication. These functions can work in cooperation with a data communication function implemented through network communication.

The information processing device 2 includes an operational panel 8 arranged for example on the front side of the body 5 and which functions as a user interface when a user operates the information processing device 2. Based on ordering operation performed by the user on the operational panel 8, for example, the information processing device 2 implements at least one of the aforementioned functions to execute a job designated by the user.

The information processing terminal 3 is composed for example of a communication terminal such as a tablet terminal or a smartphone shown in FIG. 1, or a general-purpose personal computer not shown in the drawings. The information processing terminal 3 is connected to a wide-area network or a local network via the access point 4 with or without wires to communicate with various devices through the network. Communication of the information processing terminal 3 with the information processing device 2 permits a user to remote operate the information processing device 2 from the information processing terminal 3.

Figure 2:
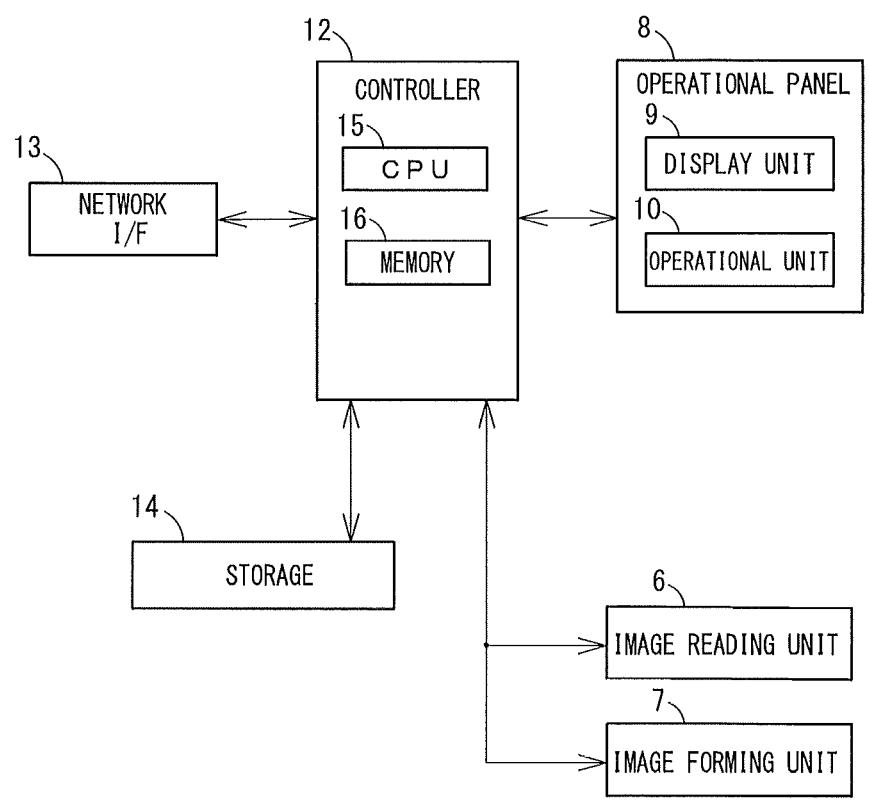
FIG. 2 shows an exemplary hardware structure of an information processing device.

FIG. 2 shows an exemplary hardware structure of the information processing device 2.

As shown in FIG. 2, the information processing device 2 includes the aforementioned image reading unit 6, image forming unit 7, and operational panel 8. The operational panel 8 includes a display unit 9 and an operational unit 10. The operational panel 8 is used to present various types of information to a user operating the operational panel 8 and to accept various operational inputs made by the user.

The information processing device 2 further includes a controller 12, a network interface (network I/F) 13, and a storage 14. The controller 12 includes a CPU 15 and a memory 16. The CPU 15 executes various programs stored in the storage 14, thereby controlling the action of each unit. The memory 16 is to store temporary data for example generated as a result of execution of the programs by the CPU 15. The network I/F 13 is to make network communication by connecting the information processing device 2 to the network.

The storage 14 is a nonvolatile storage composed for example of a hard disk drive (HDD). The storage 14 stores various programs and various types of data. The storage 14 further stores user registration information containing information about each user who is permitted to use the information processing device 2.

Figure 3:
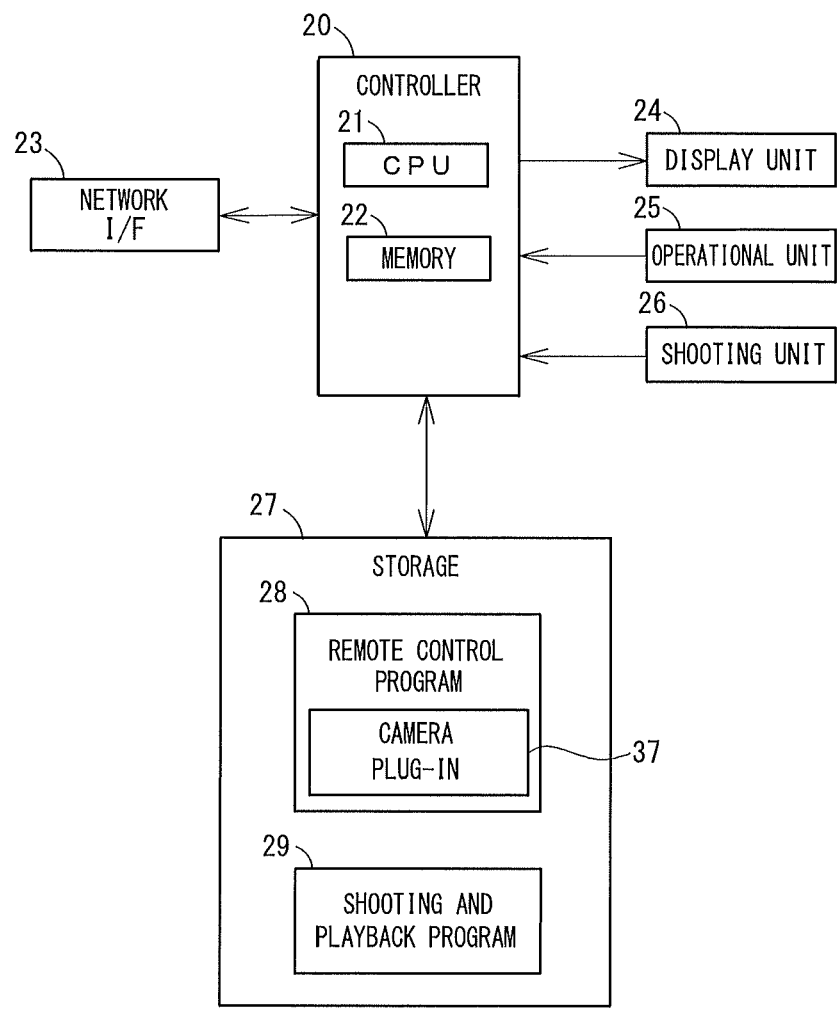
FIG. 3 shows an exemplary hardware structure of an information processing terminal.

FIG. 3 shows an exemplary hardware structure of the information processing terminal 3.

As shown in FIG. 3, the information processing terminal 3 includes a controller 20 with a CPU 21 and a memory 22, a network interface (network I/F) 23, a display unit 24, an operational unit (operational input unit) 25, a shooting unit 26, and a storage 27 composed for example of a hard disk drive (HDD) or a solid state drive (SSD).

The controller 20 controls the action of each unit in response to execution of various programs by the CPU 21. The memory 22 is to store temporary data for example generated as a result of execution of the programs by the CPU 21. The network I/F 23 is to connect the information processing terminal 3 to the network to make data communication with or without wires. The display unit 24 is used to preset various types of information to a user and is composed for example of a color liquid crystal display.

The operational unit 25 is to accept various ordering operations by a user. The operational unit 25 is composed for example of a touch panel sensor arranged on a display screen of the display unit 24. The storage 27 is a nonvolatile storage and stores a program and various types of information installed in advance on the information processing terminal 3.

Although not specifically shown in the drawings, the shooting unit 26 is composed of an image pickup element such as a CCD (charge-coupled device) to convert light from a subject of shooting to an electrical signal, an optical system to guide the light from the subject to the image pickup element, a light emitting unit to emit a flash of light, and the like.

In the information processing terminal 3 of the first preferred embodiment, a remote control program 28 is installed in advance on the storage 27. If a user orders start-up of the remote control program 28, the CPU 21 in the controller 20 reads and executes the remote control program 28. This implements a function in the information processing terminal 3 to remote control the information processing device 2 to start communication between the information processing terminal 3 and the information processing device 2. The remote control covers entire control of the information processing device 2 by the information processing terminal 3 and is not limited to control exerted on condition that the information processing terminal 3 and the information processing device 2 are spaced from each other.

A shooting and playback program 29 is further installed on the storage 27. The shooting and playback program 29 is to control a shooting and playback function that is a specific function mounted in advance on the information processing terminal 3. If a user orders start-up of the shooting and playback program 29, the CPU 21 reads and executes the shooting and playback program 29. This implements a function relating to shooting and playback in the information processing terminal 3.

Although not shown in the drawings, the storage 27 stores user information about a user. The user information is available to permit use of the information processing device 2, and is transmitted to the information processing device 2 when the information processing terminal 3 starts to remote control the information processing device 2. Transmitting the user information to the information processing device 2 allows the information processing device 2 to determine whether a user trying to operate the information processing device 2 from the information processing terminal 3 is an authorized user.

Figure 4:
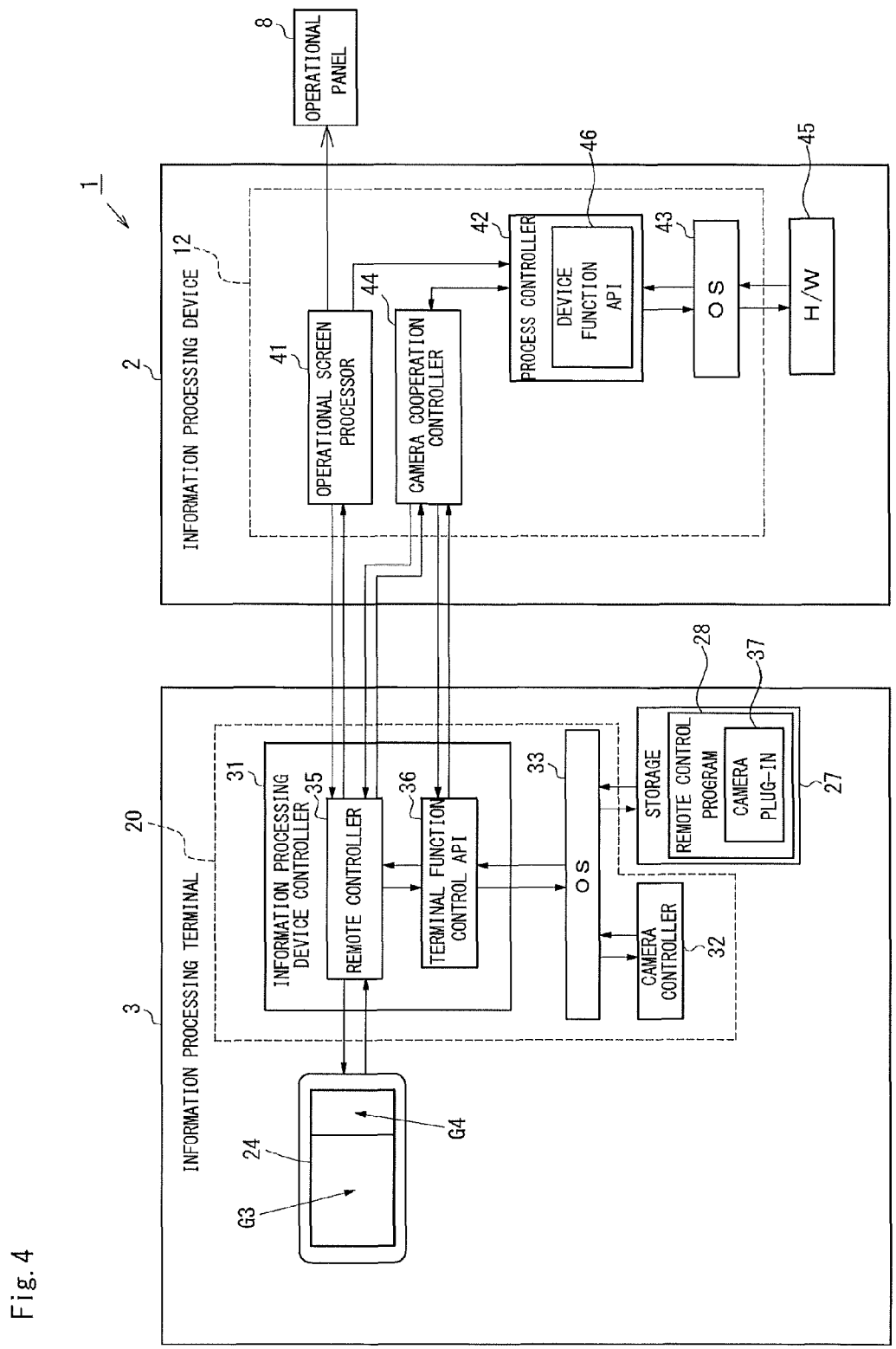
FIG. 4 is a block diagram showing a structure of making the information processing terminal and the information processing device work cooperatively in the first preferred embodiment.

The following describes a structure of making the information processing terminal 3 and the information processing device 2 work cooperatively in the information processing system 1. FIG. 4 is a block diagram showing the respective functional structures of the information processing device 2 and the information processing terminal 3.

As shown in FIG. 4, the controller 20 of the information processing terminal 3 includes an information processing device controller 31, a camera controller 32, and an OS (operating system) 33.

The information processing device controller 31 is actuated in response to reading and execution of the remote control program 28 by the CPU 21. Actuating the information processing device controller 31 implements a function in the information processing terminal 3 to remote control the information processing device 2, so that communication between the information processing terminal 3 and the information processing device 2 is started. The information processing device controller 31 includes a remote controller 35 and a terminal function control API (application program interface) 36.

The remote controller 35 is a processor to control the action of the information processing device 2 by remote operation. The remote controller 35 is mainly responsible for transmission and receipt of screen data about an operational screen to be displayed on the display unit 24 or operational information indicating operation on the operational screen to and from the information processing device 2 (operational screen processor 41 and camera cooperation controller 44 described later).

More specifically, the remote controller 35 receives screen data about an operational screen (remote operational screen described later) G3 transmitted from the information processing device 2 (operational screen processor 41 described later), and displays the remote operational screen G3 on the display unit 24 of the information processing terminal 3 based on the received screen data. In response to operation performed on the remote operational screen G3 on the display unit 24, the remote controller 35 transmits operational information indicating the operation to the information processing device 2 (operational screen processor 41). The remote controller 35 receives screen data about the updated remote operational screen G3 transmitted from the information processing device 2 in response to transmission of the operational information, and displays the remote operational screen G3 on the display unit 24 based on the received screen data. As a result, the remote operational screen G3 displayed on the information processing terminal 3 is updated to a status reflecting user's operation.

The remote controller 35 further receives screen data about a screen (terminal function screen described later; example of cooperation operational screen) G4 transmitted from the information processing device 2 (camera cooperation controller 44 described later), and displays the terminal function screen G4 on the display unit 24 of the information processing terminal 3 based on the received screen data. In response to operation performed on the terminal function screen G4 on the display unit 24, the remote controller 35 transmits operational information indicating the operation to the information processing device 2 (camera cooperation controller 44). The remote controller 35 receives screen data about the updated terminal function screen G4 transmitted from the information processing device 2 in response to transmission of the operational information, and displays the terminal function screen G4 on the display unit 24 based on the received screen data. As a result, the terminal function screen G4 displayed on the information processing terminal 3 is updated to a status reflecting user's operation.

In the first preferred embodiment, the remote controller 35 displays the remote operational screen G3 and the terminal function screen G4 in one window received from the information processing device 2 (in the first preferred embodiment, they are arranged side by side), as described later. An operational screen containing the remote operational screen G3 and the terminal function screen G4 is called an entire operational screen G2.

The terminal function control API 36 is an interface that enables interchange for example of processing data, an order or a request, or a response between the OS 33 of the information processing terminal 3 and the information processing device 2 (camera cooperation controller 44). Specifically, the terminal function control API 36 converts data such as processing data, an order or a request, or a response transmitted from the information processing device 2 for example to a command in a format that can be interpreted by the OS 33 of the information processing terminal 3, and transmits the command to the OS 33. The terminal function control API 36 also converts data such as processing data, an order or a request, or a response received from the OS 33 for example to a command in a format that can be interpreted by the information processing device 2, and transmits the command to the information processing device 2.

The camera controller 32 is an example of a terminal function controller. The CPU 21 executes the shooting and playback program 29 mounted on the information processing terminal 3, thereby realizing the camera controller 32. The camera controller 32 controls the action of the shooting unit 26 in a shooting mode. In a playback mode, the camera controller 32 reads image data about a shot image from the storage 27 and transmits the image data to the OS 33 in order to display the shot image on the display unit 24.

A camera plug-in 37 is integrated into the remote control program 28. The camera plug-in 37 is used to make the controller 12 of the information processing device 2 function as the camera cooperation controller 44 (example of cooperation controller) that makes the information processing device 2 (process controller 42 described later) and the camera controller 32 of the information processing terminal 3 work cooperatively. A plug-in is software to be added for expansion of a function.

The controller 12 of the information processing device 2 includes the operational screen processor 41, the process controller 42, an OS (operating system) 43, and the camera cooperation controller 44. Hardware 45 (hereinafter called H/W 45) of FIG. 4 is a collective term of hardware components including the image reading unit 6 and the image forming unit 7.

The operational screen processor 41 is responsible for process relating to an operational screen. Specifically, the operational screen processor 41 generates an operational screen on which the information processing device 2 is operated, and displays the operational screen on the display unit 9 of the operational panel 8.

In the first preferred embodiment, the operational screen processor 41 functions as a remote operation accepting unit. Specifically, the operational screen processor 41 transmits an operational screen displayed on the operational panel 8 to the information processing terminal 3 in order to display this operational screen on the display unit 24 of the information processing terminal 3. The operational screen processor 41 receives operational information indicting operation on the operational screen from the information processing terminal 3 and controls (updates) the operational screen based on the received operational information. More specifically, if operational information is received from the information processing terminal 3, the operational screen processor 41 analyzes the received operational information to specify process designated by a user who is operating the information processing terminal 3. If determining that the process designated by the user involves update of an operational screen, the operational screen processor 41 updates the operational screen based on the operational information. Each time the operational screen processor 41 updates an operational screen, the operational screen processor 41 displays the updated operational screen on the display unit 9 and transmits the updated operational screen to the information processing terminal 3.

The process controller 42 corresponds to an image processor. The process controller 42 controls implementation of primary functions of the information processing device 2 such as image printing and image reading. The process controller 42 includes a device function control API 46 that enables interchange for example of processing data, an order or a request, or a response between the OS 43 and the camera cooperation controller 44 of the information processing device 2 or between the OS 43 and the operational screen processor 41 of the information processing device 2.

More specifically, the device function control API 46 converts data such as processing data, an order or a request, or a response transmitted from the operational screen processor 41 or the camera cooperation controller 44 for example to a command in a format that can be interpreted by the OS 43 of the information processing device 2, and transmits the command to the OS 43. The device function control API 46 also converts data such as processing data, an order or a request, or a response received from the OS 43 for example to a command in a format that can be interpreted by the information processing terminal 3, and transmits the command to the information processing terminal 3.

The OS 43 manages the entire information processing device 2 by implementing basic functions shared among application programs mounted on the information processing device 2 such as input and output functions of making input on the operational unit 10 of the operational panel 8 and outputting a screen on the display unit 9, and management of the storage 14. The OS 43 transmits and receives data, an order and the like to and from the process controller 42 and the H/W 45.

In the first preferred embodiment, the camera plug-in 37 is read from the storage 27 of the information processing terminal 3 in response to start-up of the remote control program 28 and the CPU 15 becomes functional as a program execution unit to execute the camera plug-in 37, thereby realizing the camera cooperation controller 44.

The camera cooperation controller 44 exists on a communication path between the remote controller 35 and the process controller 42 and a communication path between the camera controller 32 and the process controller 42. The camera cooperation controller 44 makes intended communication with the remote controller 35, the terminal function control API 36, and the process controller 42, in this way, the camera cooperation controller 44 makes the remote controller 35 and the process controller 42 perform respective processes cooperatively, or makes the camera controller 32 and the process controller 42 perform respective processes cooperatively.

As described above, the camera cooperation controller 44 transmits and receives screen data about the terminal function screen G4 and operational information indicating operation on the terminal function screen G4 to and from the remote controller 35, for example. The camera cooperation controller 44 further transmits and receives an order or a request to make the camera controller 32 act for shooting or playback or an image shot by the information processing terminal 3 to and from the terminal function control API 36. The camera cooperation controller 44 also transmits and receives a preview image relating to a shot image, a request for the preview image and a request for making a print of the shot image to and from the process controller 42.

Figure 5:
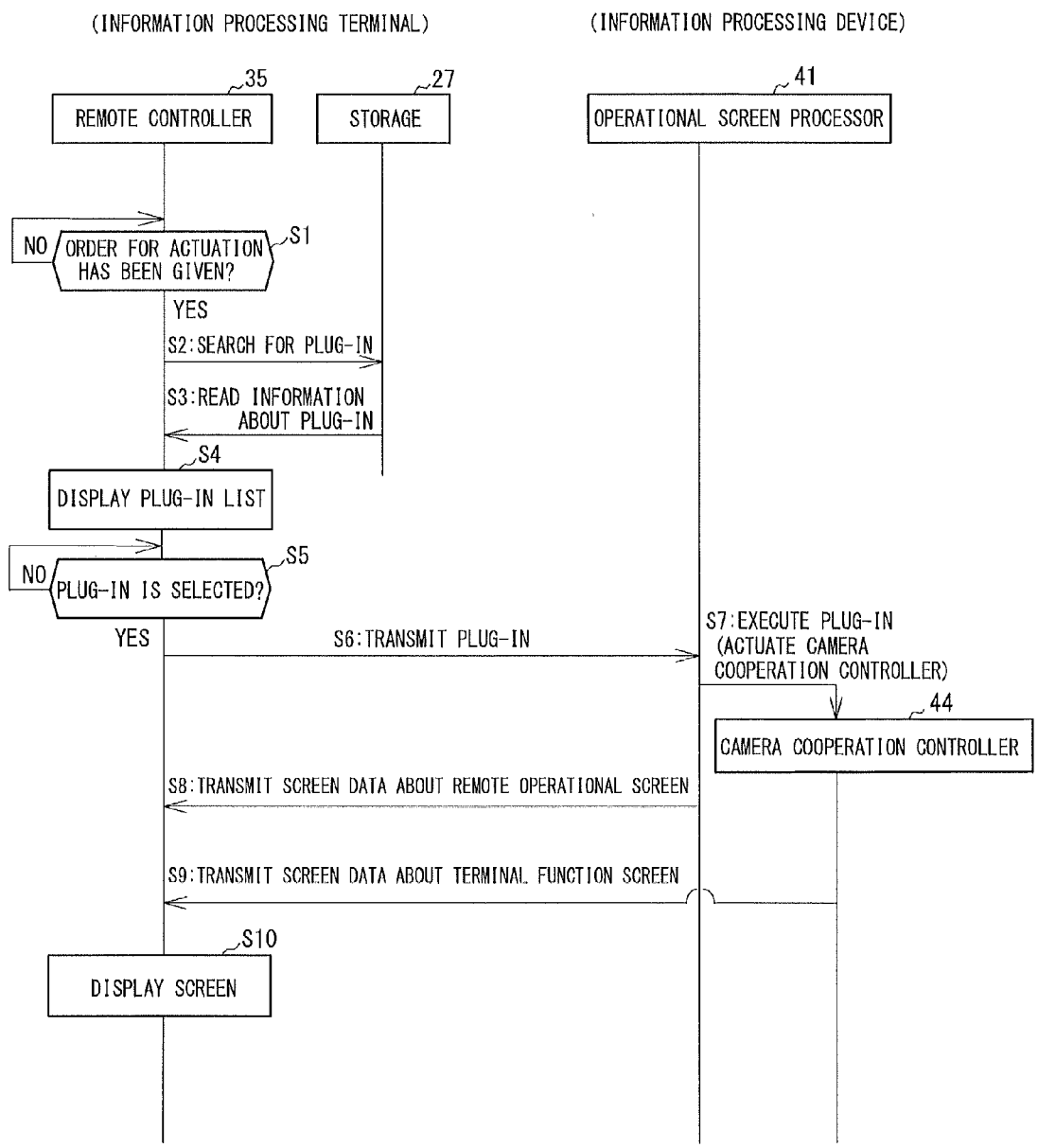
FIG. 5 is a flowchart specifically explaining how the information processing terminal (remote controller) and the information processing device (operational screen processor and camera cooperation controller) communicate with each other in response to an order to start a remote control program.
Figure 6A:
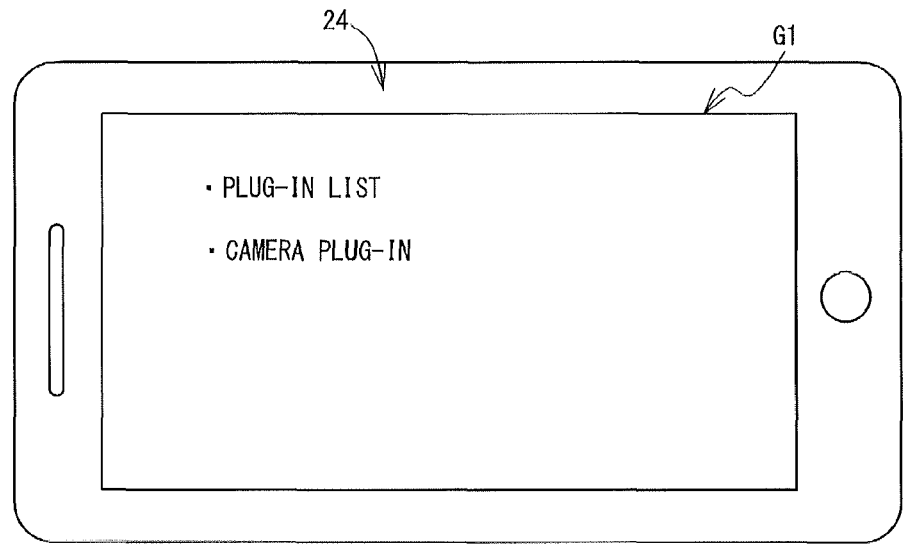
FIGS. 6A and 6B show exemplary operational screens displayed on a display unit of the information processing terminal as a result of the communication explained in FIG. 5.
Figure 6B:
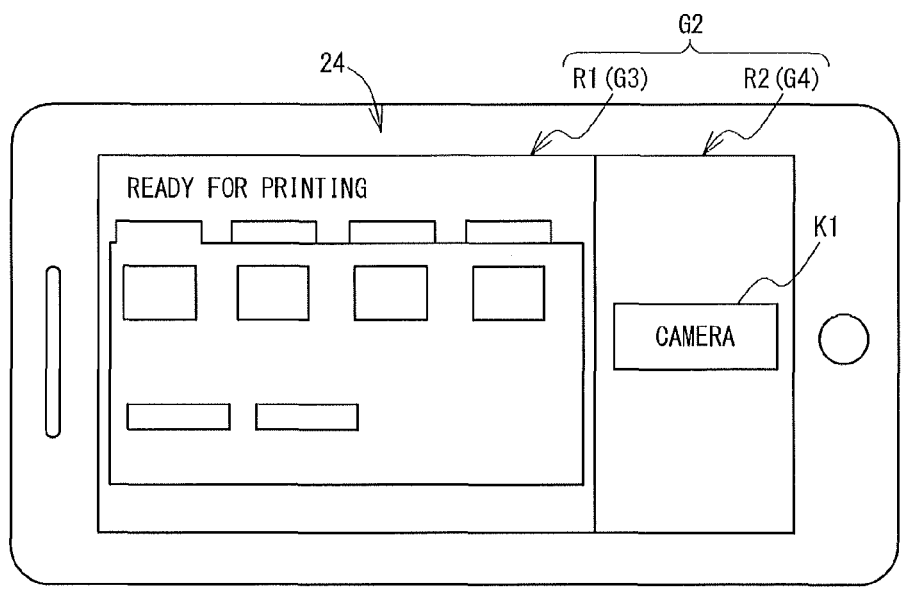

The following specifically describes communication made between the information processing terminal 3 (remote controller 35) and the information processing device 2 (operational screen processor 41 and camera cooperation controller 44) in response to an order to start the remote control program 28. FIG. 5 is a flowchart explaining process relating to this communication. FIGS. 6A and 6B show exemplary operational screens displayed on the display unit 24 of the information processing terminal 3 as a result of the communication process.

As shown in FIG. 5, if a user gives an order to start the remote control program 28 (YES of step S1), the remote controller 35 is actuated. The remote controller 35 searches the storage 27 of the same terminal (information processing terminal 3) through the OS 33 for a plug-in (step S2). If the plug-in is found in the storage 27 as a result of the search, the remote controller 35 reads information indicating the plug-in (such as the name of the plug-in) from the storage 27 (step S3). Based on the information indicating the plug-in, the remote controller 35 displays a plug-in list display screen G1 such as that of FIG. 6A on the display unit 24 (step S4). If is assumed here that the camera plug-in 37 is the only plug-in stored in the storage 27. However, a different plug-in may be stored in the storage 27 in addition to the camera plug-in 37. In this case, the plug-in list display screen G1 of FIG. 6A contains information indicating the different plug-in.

If the user selects a desirable plug-in (here, camera plug-in 37) from the plug-in list display screen G1 (YES of step S5), the remote controller 35 reads the camera plug-in 37 from the storage 27 through the OS 33, and transmits the camera plug-in 37 to the operational screen processor 41 of the information processing device 2 (step S6).

After receiving the camera plug-in 37 from the information processing terminal 3 (remote controller 35), the operational screen processor 41 stores the camera plug-in 37 into the storage 14 of the same device (information processing device 2). Then, the CPU 15 executes the camera plug-in 37, thereby actuating the camera cooperation controller 44 (step S7).

Next, the operational screen processor 41 transmits screen data about the remote operational screen G3 (see FIG. 6B) to the information processing terminal 3 (remote controller 35) (step S8). Meanwhile, the camera cooperation controller 44 generates screen data about the terminal function screen G4 and transmits the screen data to the information processing terminal 3 (remote controller 35) (step S9). Here, step S9 is described as being performed after step S8. However, this order may be reversed (step S8 may be performed after step S9).

After receiving the screen data about the remote operational screen G3 and that of the terminal function screen G4, the remote controller 35 displays the entire operational screen G2 on the display unit 24 based on each screen data (step S10). FIG. 6B shows an example of the entire operational screen G2 displayed at this moment on the display unit 24 of the information processing terminal 3.

As shown in FIG. 6B, a display region of the entire operational screen G2 on the display unit 24 is separated into right and left sides to form a remote operational screen display region R1 and a terminal function screen display region R2. The remote operational screen G3 and the terminal function screen G4 are displayed in the remote operational screen display region R1 and the terminal function screen display region R2 respectively. The terminal function screen G4 contains a camera button K1 with which start-up of the shooting and playback program 29 is ordered. The remote operational screen G3 is the same as or substantially the same as an operational screen displayed on the operational panel 8 (display unit 9) of the information processing device 2. The remote operational screen G3 is displayed to allow a user to make desirable setting about the action of the information processing device 2.

Figure 7:
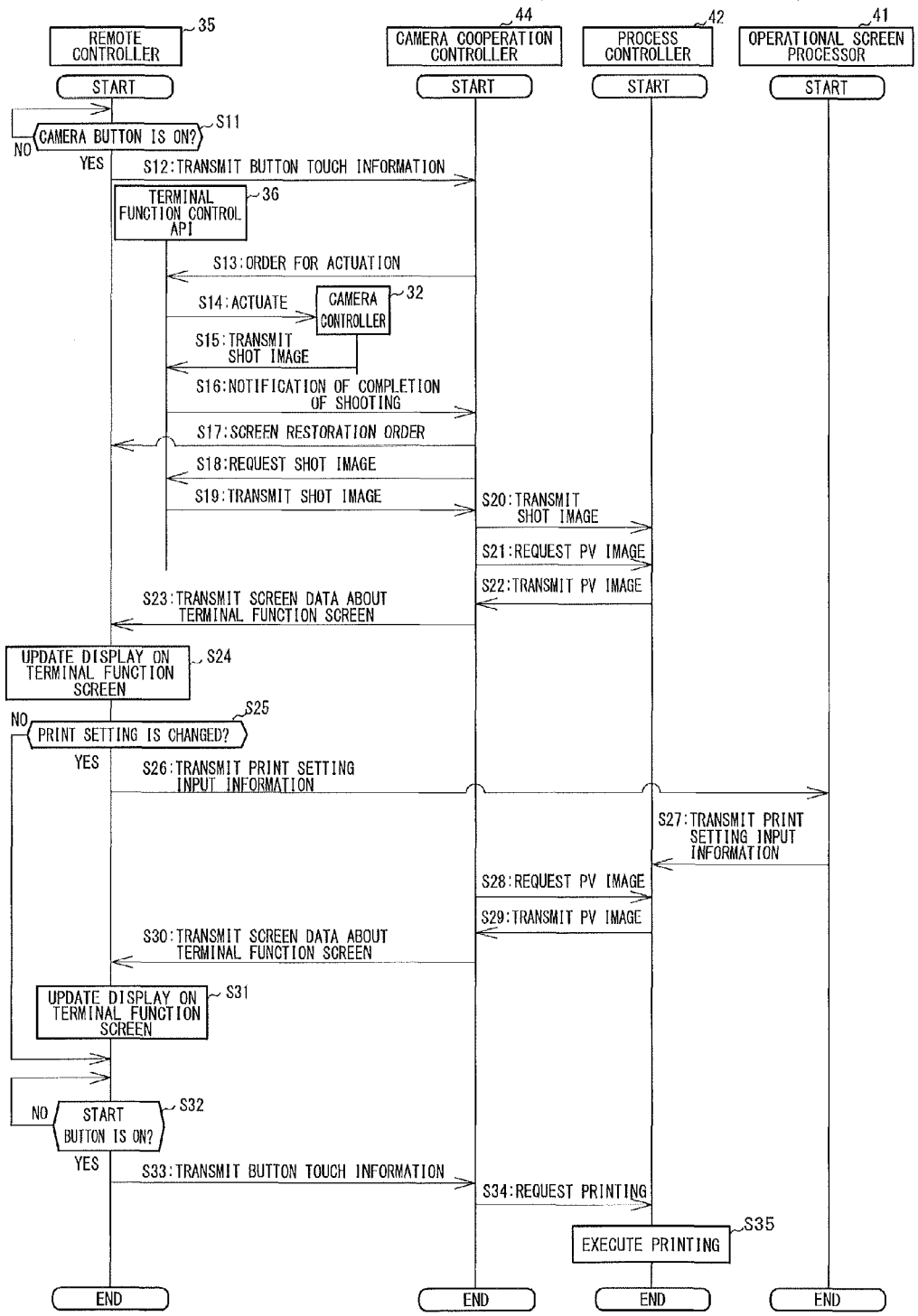
FIG. 7 is a flowchart explaining process performed in response to action on a camera button on the entire operational screen of FIG. 6B.

The following describes process performed in response to action on the camera button K1 on the entire operational screen G2 of FIG. 6B. FIG. 7 is a flowchart explaining this process.

As shown in FIG. 7, if the camera button K1 is touched (becomes ON) (YES of step S11), the remote controller 35 transmits button touch information indicating that the camera button K1 was touched to the camera cooperation controller 44 of the information processing device 2 (step S12). After receiving the button touch information, the camera cooperation controller 44 transmits an order for actuation to the terminal function control API 36 (step S13). After receiving the order for actuation, the terminal function control API 36 actuates the camera controller 32 through the OS 33 (step S14).

Figure 8A:
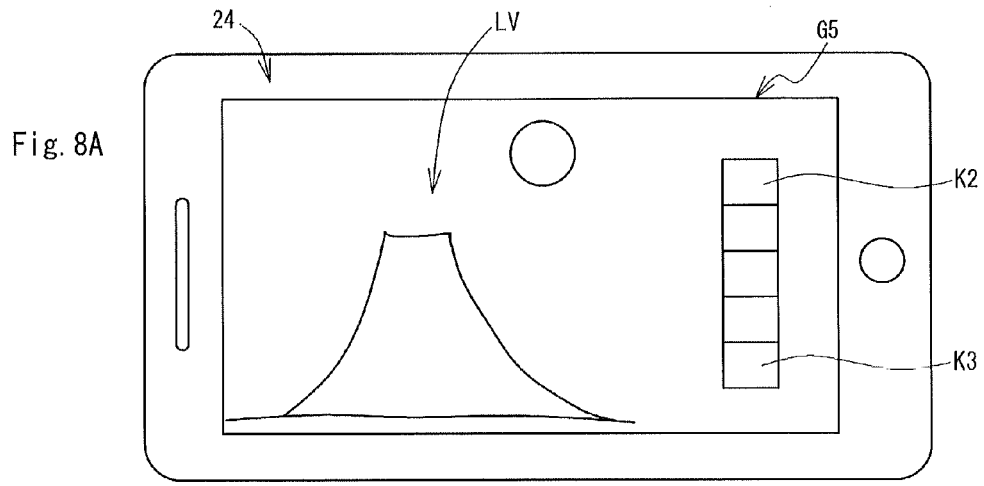
FIGS. 8A to 8C show exemplary screens displayed on the display unit of the information processing terminal.

After being actuated, the camera controller 32 displays a camera function screen (example of function screen) G5 on the display unit 24. The camera function screen G5 is the same as or substantially the same as a screen displayed if only the camera controller 32 is actuated while the remote control program 28 is not started. FIG. 8A shows an example of the camera function screen G5. As shown in FIG. 8A, the camera function screen G5 contains various operational buttons including a shooting button K2 with which an order for shooting is input and a flash button K3 with which setting for on and off of a flash is made, and a live view image LV.

If the shooting button K2 is touched on the camera function screen G5, the camera controller 32 makes the shooting unit 26 shoot an image to be stored. Then, the camera controller 32 stores image data about the shot image into a certain recording medium and transmits the image data about the shot image to the terminal function control API 36 (step S15). After receiving the image data about the shot image, the terminal function control API 36 notifies the camera cooperation controller 44 of the fact that shooting is completed (notification of completion of shooting) (step S16).

After receiving the notification of completion of shooting, the camera cooperation controller 44 transmits an order (screen restoration order) to the remote controller 35 to display the entire operational screen G2 with the remote operational screen G3 and the terminal function screen G4 again on the display unit 24 of the information processing terminal 3 (to restore a screen on the display unit 24) (step S17), Further, the camera cooperation controller 44 requests the image data about the shot image from the terminal function control API 36 (step S18). In response to this request, the terminal function control API 36 transmits the image data about the shot image to the camera cooperation controller 44 (step S19).

After receiving the image data about the shot image from the terminal function control API 36, the camera cooperation controller 44 transmits the received image data to the process controller 42 (step S20). Further, the camera cooperation controller 44 requests a preview image PV from the process controller 42 (step S21). In response to this request, the process controller 42 transmits image data about a preview image PV relating to the shot image to the camera cooperation controller 44 (step S22).

After receiving the image data about the preview image PV, the camera cooperation controller 44 generates the terminal function screen G4 containing the preview image PV (see FIG. 8B), and transmits screen data about the terminal function screen G4 to the remote controller 35 (step S23). The terminal function screen G4 contains not only the preview image PV but also a start button K4 (see FIG. 8B) with which an order to print the shot image relating to the preview image PV is input, as described later.

Figure 8B:
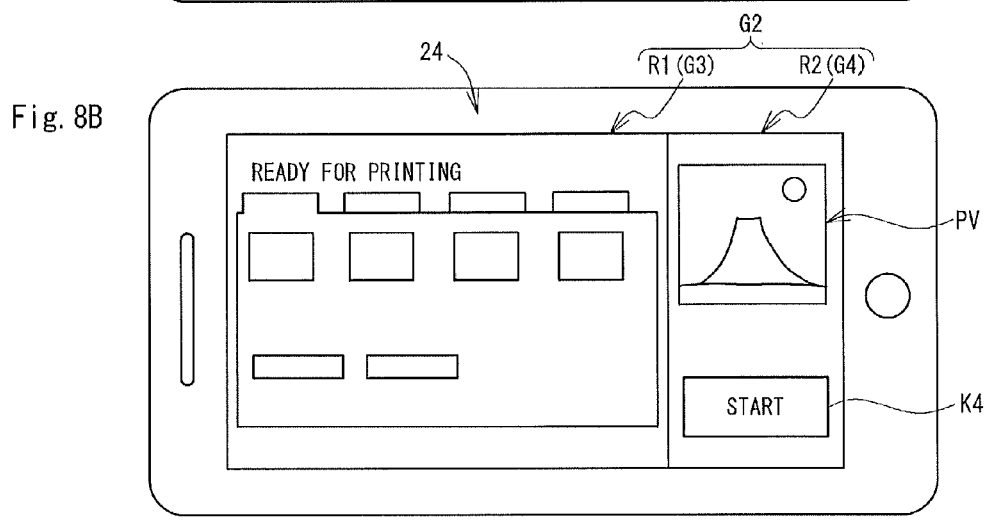

After receiving the screen data about the terminal function screen G4, the remote controller 35 updates a terminal function screen to be displayed in the terminal function screen display region R2 (step S24). FIG. 8B shows an example of the entire operational screen G2 displayed at this moment. As shown in FIG. 8B, the terminal function screen G4 as part of the entire operational screen G2 contains the preview image PV and the start button K4. By referring to the preview image PV on the terminal function screen G4, a user can examine whether a print image quality should be adjusted if the user tries to print the shot image relating to the preview image PV by the information processing device 2.

If the user adjusts a print image quality (changes print setting) on the remote operational screen G3 (YES of step S25), the remote controller 35 transmits to the operational screen processor 41 print setting input information indicating the adjustment of a print image quality thereby input (step S26). After receiving the print setting input information, the operational screen processor 41 transmits the received print setting input information to the process controller 42 (step S27).

Based on the print setting input information received from the operational screen processor 41, the process controller 42 generates a preview image. Regarding supply of a preview image generated by the process controller 42 to the camera cooperation controller 44, the process controller 42 may be configured to transmit image data about the preview image to the camera cooperation controller 44 in response to an order given by the user to update a preview image or in response to input by the user indicating completion of print setting. However, according to a configuration of the first preferred embodiment, the camera cooperation controller 44 requests a preview image from the process controller 42 at regular intervals. If the process controller 42 generates a new preview image, it transmits image data about the new preview image to the camera cooperation controller 44 in response to the request. The following explains the reason for this configuration.

It is assumed for example that the user is asked to make a decision as to whether a preview image PV on the terminal function screen G4 is to be updated, and the preview image PV is updated if the user orders update of a preview image, as described above. In this case, in a period from when the user orders update of a preview image until when an updated preview image is displayed on the terminal function screen G4, the remote controller 35, the camera cooperation controller 44, and the process controller 42 are kept busy performing respective processes relating to this preview image. This makes the information processing terminal 3 unable to accept a different order given by the user. Hence, the user should be placed in standby waiting for input of an intended order until a preview image is updated on the terminal function screen G4.

In the first preferred embodiment, in order to prevent such a situation, the camera cooperation controller 44 requests a preview image from the process controller 42 at regular intervals.

After receiving the print setting input information, in response to a request for a preview screen from the camera cooperation controller 44 (step S28), the process controller 42 transmits to the camera cooperation controller 44 a new preview image PV generated based on the adjustment of a print image quality indicated by the print setting input information (step S29). After receiving the updated preview image PV, the camera cooperation controller 44 generates the terminal function screen G4 containing the updated preview image PV and the start button K4, and transmits screen data about the terminal function screen G4 to the remote controller 35 (step S30).

Figure 8C:
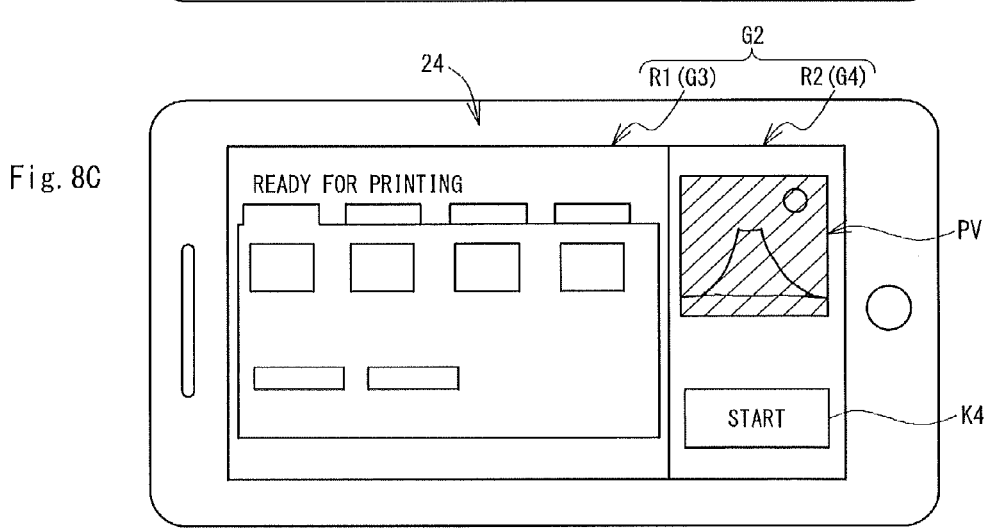

After receiving the screen data about the terminal function screen G4, the remote controller 35 updates the terminal function screen G4 in the terminal function screen display region R2 (step S31), FIG. 8C shows an example of the updated entire operational screen G2. The example of FIG. 8C shows that, as a result of the adjustment of an image quality to reduce the entire brightness of an image, the updated preview image PV on the terminal function screen G4 of FIG. 8C is entirely reduced in brightness compared to the preview image PV of FIG. 8B.

After step S31, or if the start button K4 is touched while print setting is not changed in step S25 (YES of step S32), the remote controller 35 transmits button touch information indicating that the start button K4 was touched to the camera cooperation controller 44 (step S33). After receiving the button touch information, the camera cooperation controller 44 requests the process controller 42 for printing (step S34). In response to the request for printing, the process controller 42 makes the H/W 45 make printing action (step S35).

Figure 9:
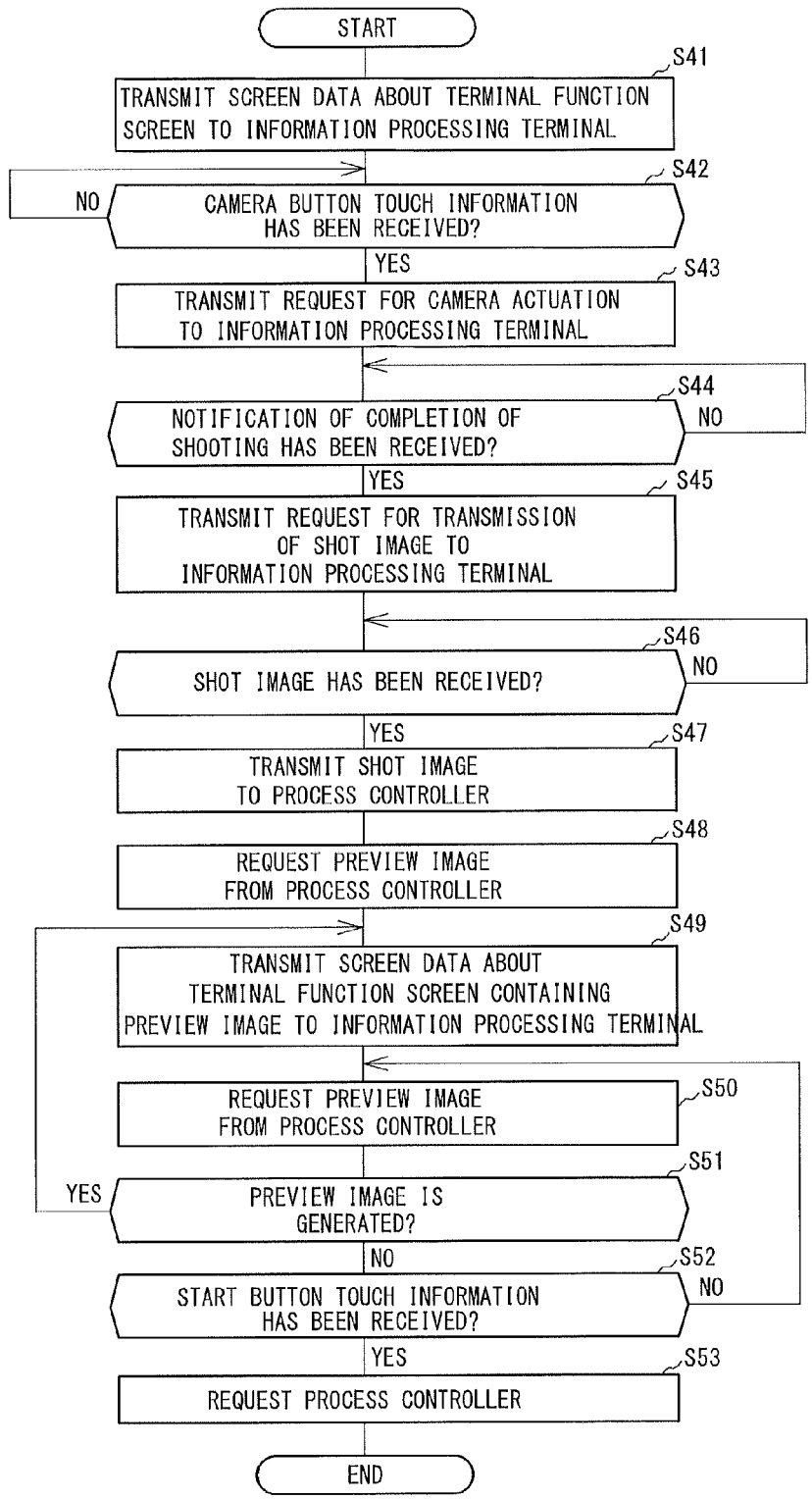
FIG. 9 is a flowchart explaining process performed by the camera cooperation controller and extracted from the processes shown in FIGS. 5 and 7.

FIG. 9 is a flowchart explaining process performed by the camera cooperation controller 44 and extracted from the processes shown in FIGS. 5 and 7.

As shown in FIG. 9, after being actuated, the camera cooperation controller 44 transmits screen data about the terminal function screen G4 (see FIG. 6B) to the information processing terminal 3 (step S41). Then, the camera cooperation controller 44 determines whether the camera button K1 was touched (step S42). If determining that the camera button K1 was touched (YES of step S42), the camera cooperation controller 44 transmits a camera actuation request requesting actuation of the camera controller 32 to the information processing terminal 3 (step S43).

If receiving a notification of completion of shooting is received thereafter from the information processing terminal 3 (YES of step S44), the camera cooperation controller 44 transmits a request for transmission of a shot image to the information processing terminal 3 (step S45). If receiving the shot image from the information processing terminal 3 (YES of step S46), the camera cooperation controller 44 transmits the received shot image to the process controller 42 (step S47). Further, the camera cooperation controller 44 requests a preview image PV from the process controller 42 (step S48).

After receiving the preview image PV from the process controller 42, the camera cooperation controller 44 transmits screen data about the terminal function screen G4 containing the received preview image PV to the information processing terminal 3 (step S49). If time has come to request a preview image from the process controller 42, the camera cooperation controller 44 requests the preview image from the process controller 42 (step S50). If a new preview image PV is generated by the process controller 42 (YES of step S51), the camera cooperation controller 44 returns to step S49. If a new preview image PV is not generated by the process controller 42 (NO of step S51), the camera cooperation controller 44 determines whether button touch information about the start button K4 has been received (step S52).

If determining that the button touch information about the start button K4 has not been received (NO of step S52), the camera cooperation controller 44 returns to step S50. If determining that this button touch information has been received (YES of step S52), the camera cooperation controller 44 requests the process controller 42 for printing (step S53).

The specifications of the camera plug-in 37 are described next. The camera plug-in 37 contains display information about the terminal function screen G4 and information about process corresponding to each button. The display information about the terminal function screen G4 includes information about the camera button K1, information about the start button K4, and display layout information.

The process corresponding to each button includes process corresponding to the camera button K1 and process corresponding to the start button K4. In the first preferred embodiment, the following processes are defined as the process corresponding to the camera button K1:

(1) process of making the terminal function control API 36 (camera shooting API) start the camera function (shooting and playback function) of the information processing terminal 3;

(2) process of making the terminal function control API 36 (camera shooting API) transmit an image shot by the camera function;

(3) process of making the terminal function control API 36 (camera shooting API) transfer the received shot image to the process controller 42;

(4) process of generating a preview image by using the device function control API 46 (preview image generating API); and (5) process of updating a preview image reflecting print setting appropriately by using the device function control API 46 (preview image generating API) regularly.

Process of making a print by using the device function control API 46 (preview image generating API) is defined as the process corresponding to the start button K4.

The camera shooting API is part of the terminal function control API 36 and is used to implement the camera function of the information processing terminal 3. The preview image generating API is part of the device function control API 46 and is used to implement the function of generating a preview image.

As described above, in the first preferred embodiment, the remote controller 35 is actuated in response to an order given by a user to start the remote control program 28. In response to certain user's operation, the remote controller 35 actuates the camera cooperation controller 44 that functions to make the information processing device 2 and the camera controller 32 work cooperatively. The camera cooperation controller 44 functions to display the terminal function screen G4 on the display unit 24 that is used for making the information processing device 2 and the camera controller 32 work cooperatively. Thus, the camera function of the information processing terminal 3 and the remote control function are not required to be started individually by respective operations.

As described above, the camera cooperation controller 44 makes the information processing device 2 and the camera controller 32 work cooperatively. This eliminates the need for operation of transmitting data processed by the camera controller 32 to the information processing device 2, for example.

Eliminating labor involved in the aforementioned operations makes it possible to form an information processing system with favorable convenience.

In the first preferred embodiment, after a print image quality is adjusted on the remote operational screen G3, a preview image relating to a shot image thereby adjusted is generated and a preview image displayed on the terminal function screen G4 is updated. A result of process based on operation performed on the remote operational screen G3 is reflected in the contents of display on the terminal function screen G4.

This allows a user to determine the appropriateness of adjustment of a print image quality made by the user himself or herself while checking the terminal function screen G4 visually, thereby enhancing the convenience of the information processing system 1.

The remote operational screen G3 and the terminal function screen G4 are displayed side by side on the display unit 24. Thus, shooting action and printing action can be made only by the information processing terminal 3. This further enhances the convenience of the information processing system 1.

A second preferred embodiment of the present invention is described next.

In the first preferred embodiment, after a print image quality is adjusted on the remote operational screen G3, a preview image relating to a shot image thereby adjusted is generated and a preview image displayed on the terminal function screen G4 is updated. In this way, a result of process based on operation performed on the remote operational screen G3 is reflected in the contents of display on the terminal function screen G4. In the second preferred embodiment, the substance of operation performed on the terminal function screen G4 is reflected in the contents of display on the remote operational screen G3.

The following shows a specific example of a way of reflecting the substance of operation performed on the terminal function screen G4 in the contents of display on the remote operational screen G3. The terminal function screen G4 contains a button that permits a user to designate one adjustment or multiple adjustments of a print image quality collectively with a single touch of this button. In response to touch of this button by the user, the adjustment of a print image quality corresponding to the button appears on the remote operational screen G3. This exemplary way is described below.

Figure 10A:
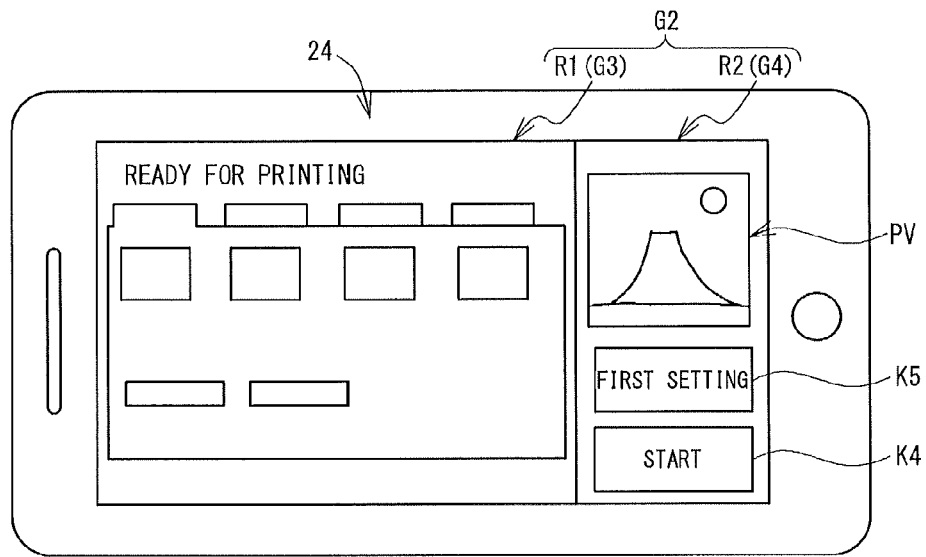
FIGS. 10A and 10B show exemplary screens displayed on the display unit of the information processing terminal.

FIG. 10A shows an example of the entire operational screen G2 of the second preferred embodiment that is displayed on the display unit 24 based on screen data transmitted from the camera cooperation controller 44 in response to touch of the shooting button K2 of FIG. 8A.

As shown in FIG. 10A, the entire operational screen G2 of the second preferred embodiment includes the remote operational screen G3 substantially the same as that of FIG. 8B and the terminal function screen G4 different from that of the first preferred embodiment. The terminal function screen G4 contains a preview image PV, a start button K4 and additionally, a first setting button K5 as a shortcut button. The first setting button K5 permits designation of one adjustment or collective designation of multiple adjustments of a print image quality with a single touch of the first setting button K5.

Figure 10B:
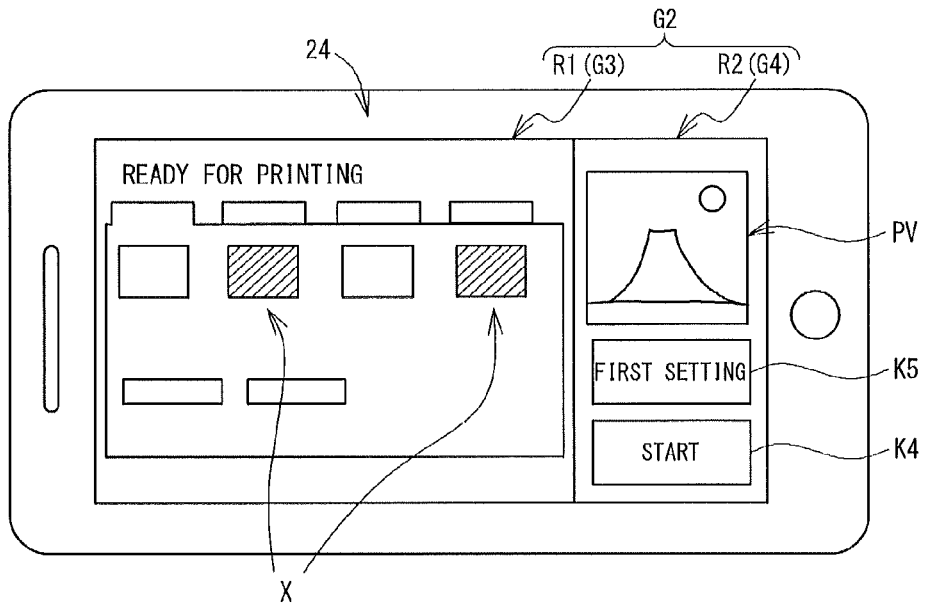

If a user touches the first setting button K5, adjustment of a print image quality corresponding to the first setting button K5 appears on the remote operational screen G3 as shown in FIG. 10B. On the remote operational screen G3 of FIG. 10B, as shown by arrows X, character images corresponding to adjusted items of a print image quality are displayed in a different color. Thus, it is seen from the remote operational screen G3 that the input adjustments of a print image quality corresponding to these items will be applied during printing.

Figure 11:
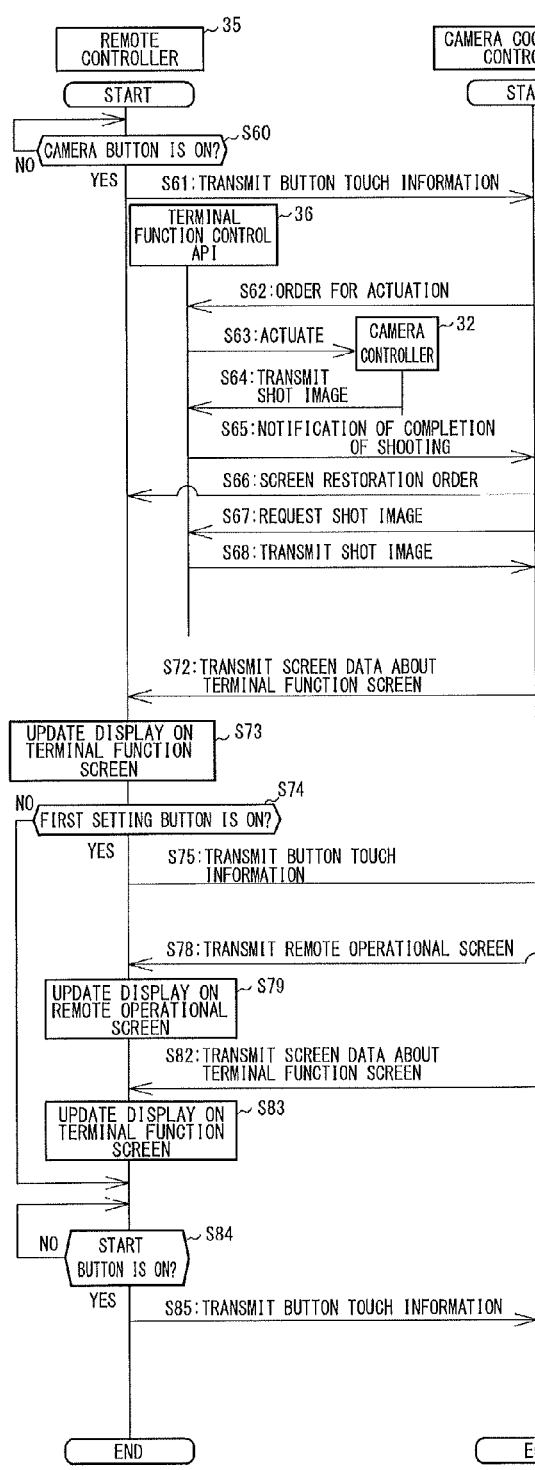
FIG. 11 is a flowchart explaining process performed in response to action on the camera button on the entire operational screen of FIG. 6B.
Figure 11:
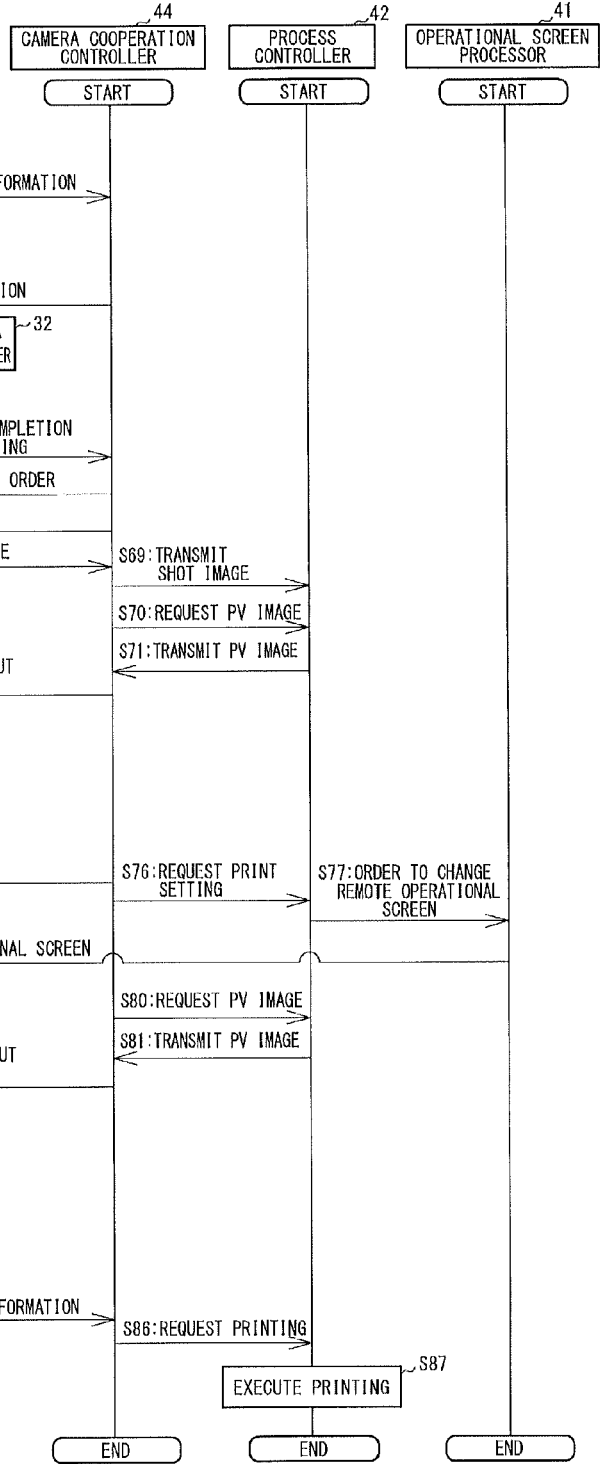

The following describes process performed in the second preferred embodiment in response to action on the camera button K1 on the entire operational screen G2 of FIG. 6B. FIG. 11 is a flowchart explaining this process.

As shown in FIG. 11, if the camera button K1 is touched (becomes ON) (YES of step S60), processes same as those of steps S11 to S24 of FIG. 7 of the first preferred are performed (in steps S60 to S73).

After step S73, the remote controller 35 determines whether the first setting button K5 was touched (becomes ON) (step S74). If determining that the first setting button K5 was touched (YES of step S74), the remote controller 35 transmits button touch information indicating that the first setting button K5 was touched to the camera cooperation controller 44 of the information processing device 2 (step S75). After receiving the button touch information, the camera cooperation controller 44 requests the process controller 42 to apply adjustment of a print image quality corresponding to the first setting button K5 as setting on a print image quality (step S76). In response to this request, the process controller 42 orders the operational screen processor 41 to change display on the remote operational screen G3 such that the remote operational screen G3 indicates the adjustment of a print image quality corresponding to the first setting button K5 (step S77). Based on this order, the operational screen processor 41 generates a new remote operational screen G3 and transmits screen data about the updated remote operational screen G3 to the remote controller 35 (step S78). After receiving the screen data, the remote controller 35 updates display on the remote operational screen G3 based on the received screen data (step S79).

Then, the process controller 42, the camera cooperation controller 44, and the remote controller 35 perform processes (in steps S80 to S87) same as those of steps S28 to S35 in the flowchart of the first preferred embodiment shown in FIG. 7.

Figure 12:
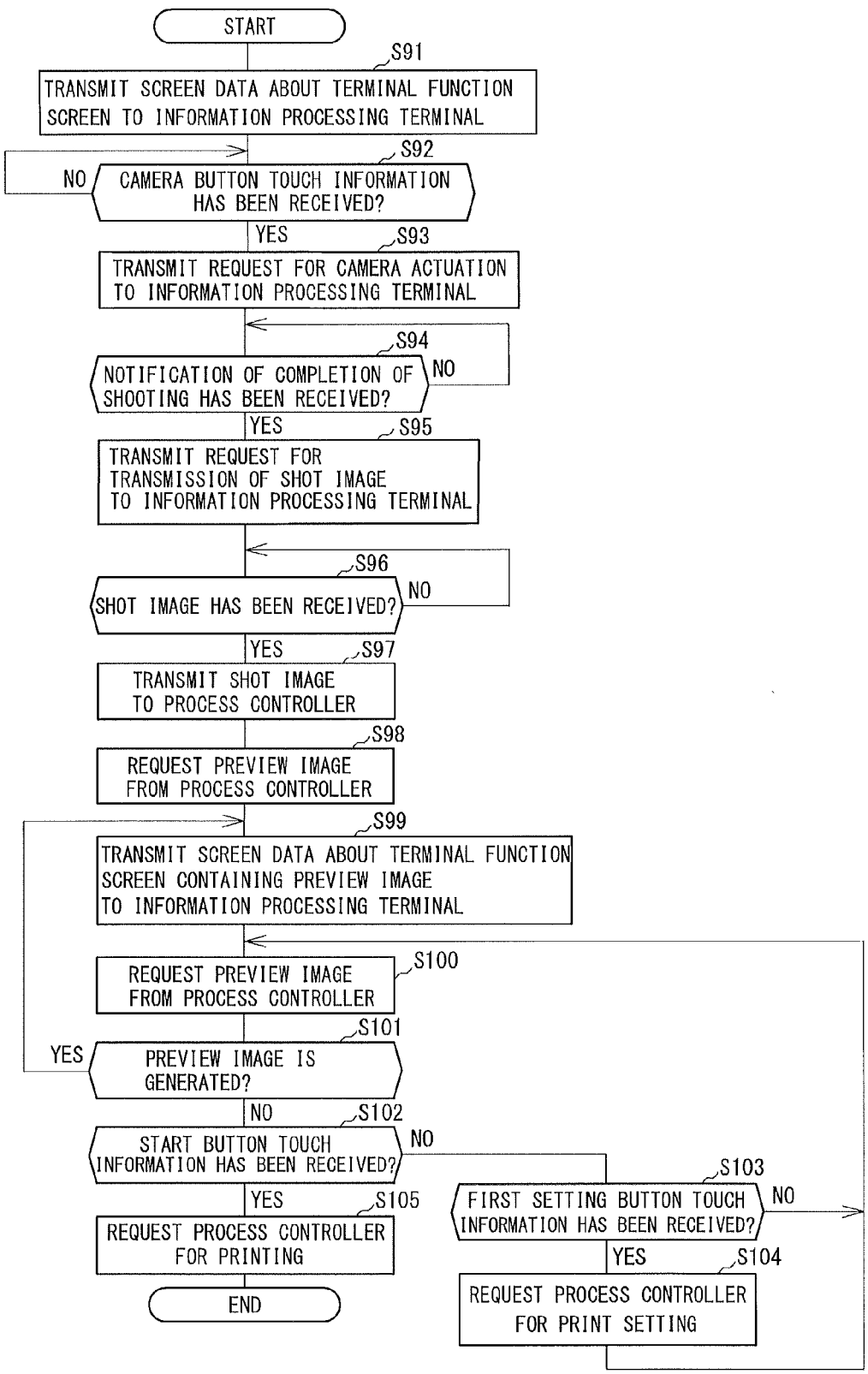
FIG. 12 is a flowchart explaining process performed by the camera cooperation controller and extracted from the processes shown in FIGS. 5 and 11.

FIG. 12 is a flowchart explaining process performed by the camera cooperation controller 44 and extracted from the processes shown in FIGS. 5 and 11. The flowchart of FIG. 12 mainly differs in the presence of steps S103 and S104 from the flowchart of the first preferred embodiment shown in FIG. 9.

As shown in FIG. 12, after being actuated, the camera cooperation controller 44 performs processes (in steps S91 to S98) same as those of steps S41 to S48 of FIG. 9 of the first preferred embodiment.

After step S98, if receiving a preview image PV from the process controller 42, the camera cooperation controller 44 transmits to the information processing terminal 3 screen data about the terminal function screen G4 containing the received preview image PV, the first setting button K5, and others (step S99).

If time has come to request a preview image from the process controller 42, the camera cooperation controller 44 requests the preview image from the process controller 42 (step S100). If a new preview image PV is generated by the process controller 42 (YES of step S101), the camera cooperation controller 44 returns to step S99. If a new preview image PV is not generated by the process controller 42 (NO of step S101), the camera cooperation controller 44 determines whether button touch information about the start button K4 has been received (step S102).

If determining that the button touch information about the start button K4 has not been received (NO of step S102), the camera cooperation controller 44 of the first preferred embodiment returns to step S50 in the flowchart of FIG. 9 (corresponding to step S100 of the second preferred embodiment). In this case, the camera cooperation controller 44 of the second preferred embodiment determines whether button touch information about the first setting button K5 has been received (step S103).

If determining that the button touch information about the first setting button K5 has not been received (NO of step S103), the camera cooperation controller 44 returns to step S100. If determining that this button touch information has been received (YES of step S103), the camera cooperation controller 44 requests the process controller 42 to apply adjustment of a print image quality corresponding to the first setting button K5 as setting on a print image quality (step S104). Then, the camera cooperation controller 44 returns to step S100. If determining thereafter that the button touch information about the start button K4 has been received (YES of step S102), the camera cooperation controller 44 requests the process controller 42 for printing (step S105).

As described above, in the second preferred embodiment, the terminal function screen G4 contains the first setting button K5 that permits designation of one adjustment or collective designation of multiple adjustments of a print image quality with a single touch of the first setting button K5. In response to touch of the first setting button K5, the adjustment of a print image quality corresponding to the first setting button K5 appears on the remote operational screen G3. In this way, the substance of operation performed on the terminal function screen G4 is reflected in the contents of display on the remote operational screen G3. This allows a user to determine whether adjustment of a print image quality input by the user agrees with intended adjustment of a print image quality, thereby enhancing the convenience of the information processing system 1.

A third preferred embodiment of the present invention is described next.

In the first preferred embodiment, if the shooting unit 26 shoots an image to be stored in response to touch of the shooting button K2, the entire operational screen G2 including the remote operational screen G3 and the terminal function screen G4 takes the place of the camera function screen G5 (see FIG. 8A) to be displayed again on the display unit 24 of the information processing terminal 3 (screen on the display unit 24 is restored). Accordingly, even if a user hopes to shoot images continuously, a screen on the display unit 24 is restored each time one shooting is completed. Hence, in order to continue shooting, the camera function screen G5 should be displayed again and this might make it impossible to shoot images continuously at short time intervals. Accordingly, for continuous shooting, it is preferable that the camera function screen G5 be kept displayed until the continuous shooting is completed without making the aforementioned screen restoration.

In the third preferred embodiment, in response to an order to set a continuous shooting mode, the remote operational screen G3 and the camera function screen G5 are displayed on different display units (the display unit 9 of the information processing device 2 and the display unit 24 of the information processing terminal 3). In the third preferred embodiment, the remote operational screen G3 is displayed on the display unit 9 of the information processing device 2, whereas the camera function screen G5 is displayed on the display unit 24 of the information processing terminal 3.

FIG. 13 shows an example of the entire operational screen G2 of the third preferred embodiment displayed on the display unit 24 of the information processing terminal 3 if the camera plug-in 37 is selected from the plug-in list display screen G1 of FIG. 6A.

Figure 13A:
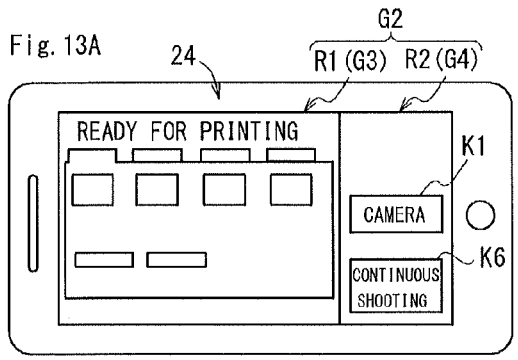
FIGS. 13A to 13F show exemplary screens displayed on the display unit of the information processing terminal.

The entire operational screen G2 of FIG. 13A includes the remote operational screen G3 substantially the same as that of FIG. 6A and the terminal function screen G4 partially different from that of the first preferred embodiment. The terminal function screen G4 of the third preferred embodiment contains a continuous shooting button K6 in addition to the camera button K1. The continuous shooting button K6 is a button with which an order is input to make a shift to a continuous shooting mode where the shooting unit 26 shoots multiple images (shoots an image several times) continuously. The continuous shooting may be automatic shooting that makes the information processing terminal 3 shoot images continuously (shoot an image several times) at certain time intervals. The continuous shooting may also be manual continuous shooting that makes a user shoot an intended number of images continuously according to desirable opportunities for shooting.

Figure 13B:
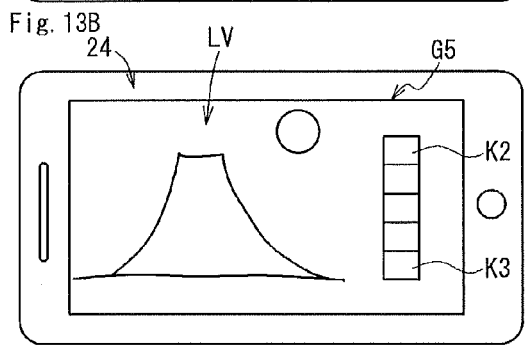

In the third preferred embodiment, if a user touches the continuous shooting button K6, the camera function screen G5 is displayed on the display unit 24 of the information processing terminal 3 as shown in FIG. 13B. Meanwhile, a usual panel operational screen G6 is displayed on the display unit 9 of the information processing device 2 as shown in FIG. 13E. Here, it is assumed that the panel operational screen G6 of FIG. 13E appears before shift to the continuous shooting mode. Accordingly, the shift to the continuous shooting mode in response to touch of the continuous shooting button K6 does not change a display screen on the display unit 9 of the information processing device 2. However, if an entry screen for entry of login ID or a password appears on the display unit 9 before the shift to the continuous shooting mode, the shift to the continuous shooting mode changes a display screen from the entry screen to the usual panel operational screen G6. The shift to the continuous shooting mode may be indicated on the panel operational screen G6.

Figure 13C:
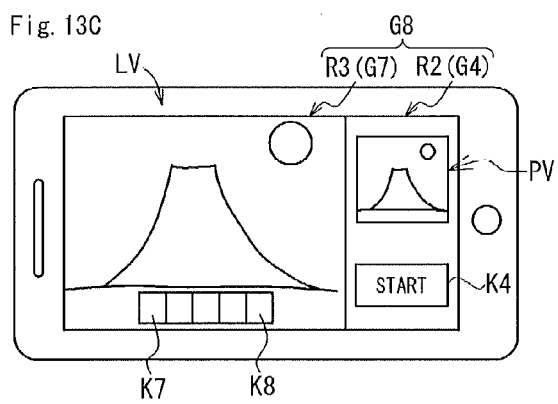
Figure 13E:
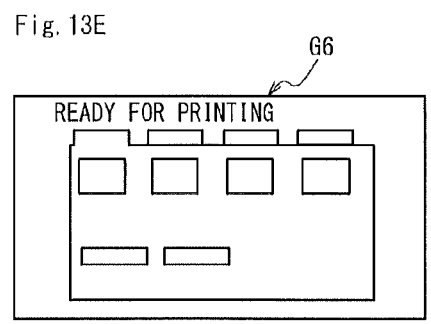

If the shooting button K2 is touched on the camera function screen G5, an entire operational screen G8 such as that of FIG. 13C is displayed on the display unit 24 of the information processing terminal 3. The entire operational screen G8 of FIG. 13C has a terminal function screen display region R2 and a live view image display region R3. A preview image PV and the start button K4 are displayed in the terminal function screen display region R2. A live view image display screen G7 containing a live view image LV is displayed in the live view image display region R3. In the third preferred embodiment, the live view image display screen G7 further contains various operational buttons such as a shooting button K7 and a flash button K8 provided to enable continuous shooting.

Figure 13D:
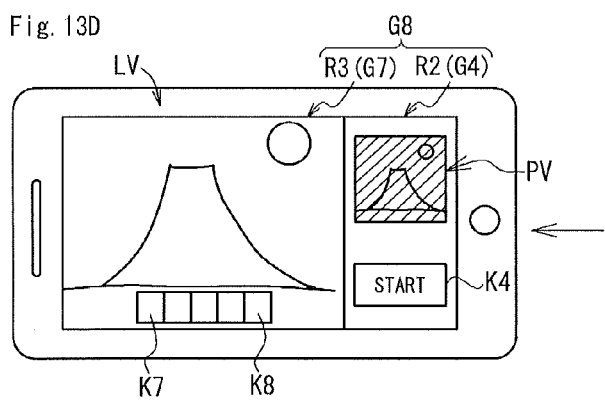
Figure 13F:
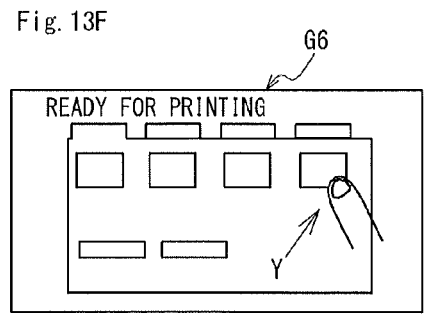

If intended adjustment of a print image quality is made on the panel operational screen G6 displayed on the display unit 9 of the information processing device 2 as shown by an arrow Y of FIG. 13F while the entire operational screen G8 of FIG. 13C is displayed, a shot image is subjected to image process responsive to the adjustment. As a result, a preview image on the display unit 24 of the information processing terminal 3 is updated to a preview image of the shot image thereby processed as shown in FIG. 13D. The example of FIG. 13D shows that, as a result of the adjustment of an image quality to reduce the entire brightness of an image, the updated preview image PV on the terminal function screen G4 of FIG. 13D is entirely reduced in brightness compared to the preview image PV of FIG. 13C. In the third preferred embodiment, in order to permit continuous shooting thereafter on the entire operational screen G8 displayed at this moment, the live view image display screen G7 contains various operational buttons such as the shooting button K7 and the flash button K8.

Figure 14:
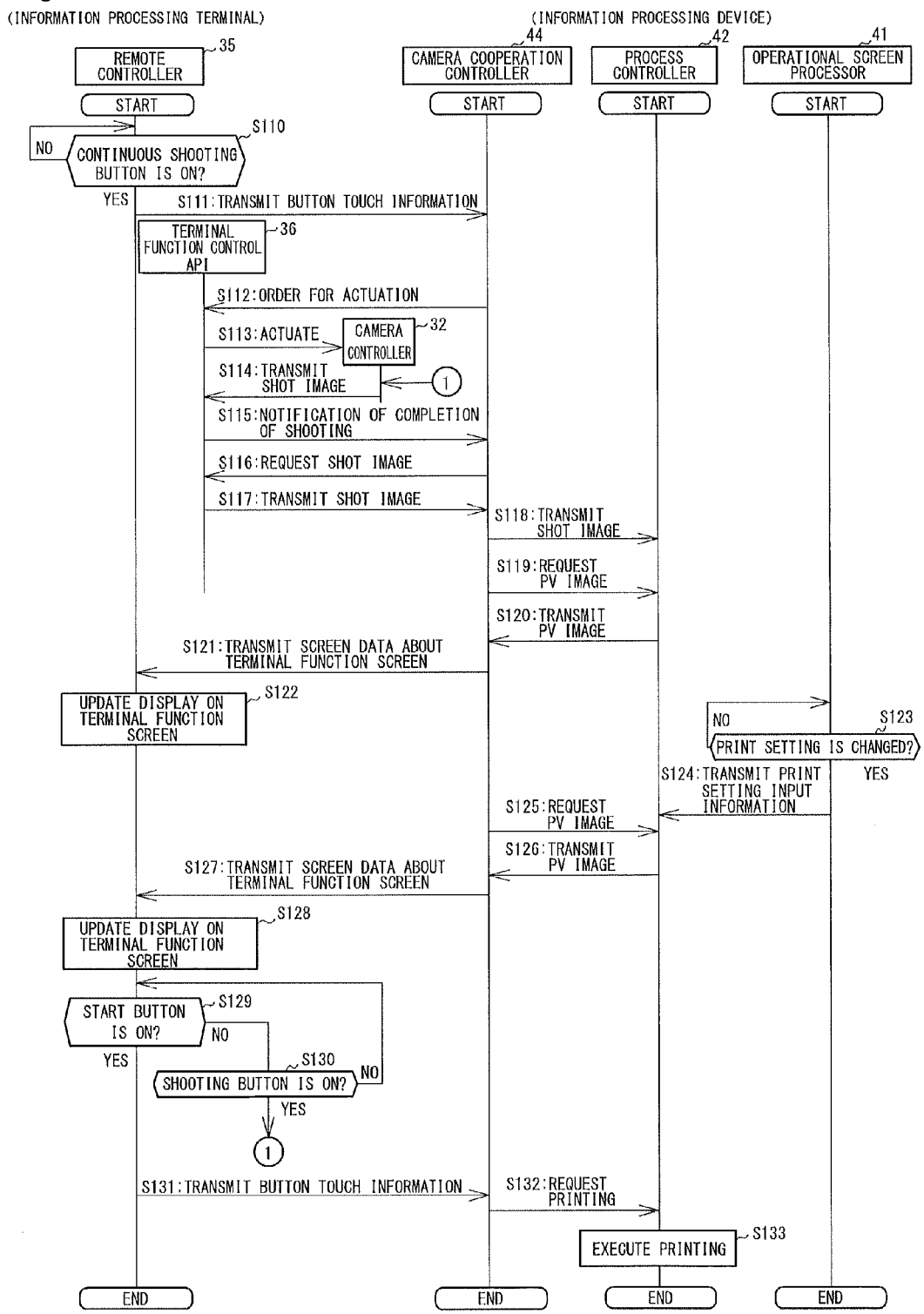
FIG. 14 is a flowchart explaining process performed in response to action on a continuous shooting button on the entire operational screen of FIG. 13A.

The following describes process performed in response to action on the continuous shooting button K6 on the entire operational screen G2 of FIG. 13A. FIG. 14 is a flowchart explaining this process. Here, it is assumed that the continuous shooting is manual continuous shooting that makes a user shoot an intended number of images continuously according to desirable opportunities for shooting.

As shown in FIG. 14, if the continuous shooting button K6 is touched (becomes ON) (YES of step S110), the remote controller 35 transmits button touch information indicating that the continuous shooting button K6 was touched to the camera cooperation controller 44 of the information processing device 2 (step S111). After receiving the button touch information, the camera cooperation controller 44 transmits an order for actuation to the terminal function control API 36 (step S112). After receiving the order for actuation, the terminal function control API 36 actuates the camera controller 32 through the OS 33 (step S113). After being actuated, the camera controller 32 displays the camera function screen G5 on the display unit 24 (see FIG. 13B).

If the shooting button K2 is touched on the camera function screen G5, the camera controller 32 makes the shooting unit 26 shoot an image to be stored. Then, the camera controller 32 stores image data about the shot image into a certain recording medium and transmits the image data about the shot image to the terminal function control API 36 (step S114). After receiving the image data about the shot image, the terminal function control API 36 notifies the camera cooperation controller 44 of the fact that shooting is completed (notification of completion of shooting) (step S115).

In the first preferred embodiment, after receiving the notification of completion of shooting, the camera cooperation controller 44 transmits an order to the remote controller 35 to display the entire operational screen G2 with the remote operational screen G3 and the terminal function screen G4 again on the display unit 24 (to restore a screen on the display unit 24). In the third preferred embodiment, in order to permit continuous shooting, the camera cooperation controller 44 does not output an order for restoration.

After receiving the notification of completion of shooting from the terminal function control API 36, the camera cooperation controller 44 requests the shot image from the terminal function control API 36 (step S116). In response to the request from the camera cooperation controller 44, the terminal function control API 36 transmits image data about the shot image to the camera cooperation controller 44 (step S117).

After receiving the image data about the shot image from the terminal function control API 36, the camera cooperation controller 44 transmits the received image data to the process controller 42 (step S118). Further, the camera cooperation controller 44 requests a preview image from the process controller 42 (step S119). In response to this request from the camera cooperation controller 44, the process controller 42 transmits image data about a preview image relating to the shot image to the camera cooperation controller 44 (step S120).

After receiving the image data about the preview image, the camera cooperation controller 44 generates the terminal function screen G4 containing the preview image PV and the start button K4 and transmits screen data about the terminal function screen G4 to the remote controller 35 (step S121). After receiving the screen data about the terminal function screen G4, the remote controller 35 displays this terminal function screen G4 in the terminal function screen display region R2 (step S122). At this moment, the live view image LV is kept displayed and the live view image display screen G7 is displayed where the positions of the shooting button K2 and the flash button K3 are changed appropriately (see FIG. 13C).

If the user performs operation for print setting change (adjustment of a print image quality) on the panel operational screen G6 displayed on the display unit 9 of the information processing device 2 (YES of step S123), the operational screen processor 41 transmits to the process controller 42 print setting input information indicating the adjustment of a print image quality thereby input (step S124).

In the third preferred embodiment, the camera cooperation controller 44 also requests the process controller 42 to generate a preview image at regular intervals. Accordingly, after receiving the print setting input information, in response to a request for a preview screen from the camera cooperation controller 44 (step S125), the process controller 42 transmits to the camera cooperation controller 44 a preview image generated based on the adjustment of a print image quality indicated by the print setting input information (step S126). After receiving the updated preview image PV, the camera cooperation controller 44 generates the terminal function screen G4 containing the updated preview image PV and the start button K4 (see FIG. 13D), and transmits screen data about the terminal function screen G4 to the remote controller 35 (step S127). After receiving the screen data about the terminal function screen G4, the remote controller 35 updates the terminal function screen G4 in the terminal function screen display region R2 based on the received screen data (step S128).

After step S128, the remote controller 35 determines whether the start button K4 was touched (step S129). If determining that the start button K4 was not touched (NO of step S129), the remote controller 35 determines whether the shooting button K2 was touched (step S130). If determining that the shooting button K2 was touched (YES of step S130), the remote controller 35 returns to step S114. If determining that the shooting button K2 was not touched (NO of step S130), the remote controller 35 returns to step S129.

If determining in step S129 that the start button K4 was touched (YES of step S129), the remote controller 35 transmits button touch information indicating that the start button K4 was touched to the camera cooperation controller 44 of the information processing device 2 (step S131). After receiving the button touch information, the camera cooperation controller 44 requests the process controller 42 for printing (step S132). In response to the request for printing, the process controller 42 makes the H/W 45 make printing action (step S133).

As described above, in the third preferred embodiment, as a result of shift to the continuous shooting mode in response to touch of the continuous shooting button K6, the panel operational screen G6 is displayed on the display unit 9 of the information processing device 2 whereas the entire operational screen G8 containing the live view image LV is displayed on the display unit 24 of the information processing terminal 3. These display statuses continue until continuous shooting is completed.

This allows the user to adjust a print image quality of a shot image not on the remote operational screen G3 but on the panel operational screen G6 on the display unit 9 of the information processing device 2 that is kept displayed until continuous shooting is completed. If continuous shooting is manual continuous shooting, the shooting button K2 is kept displayed until the continuous shooting is completed. This allows the user to shoot images according to desirable opportunities for shooting.

Adjustment of a print image quality is shown (reflected) on the display unit 24 of the information processing terminal 3. This allows the user to determine whether adjustment of a print image quality input by the user agrees with intended adjustment of a print image quality, thereby enhancing the convenience of the information processing system 1.

Figure 15:
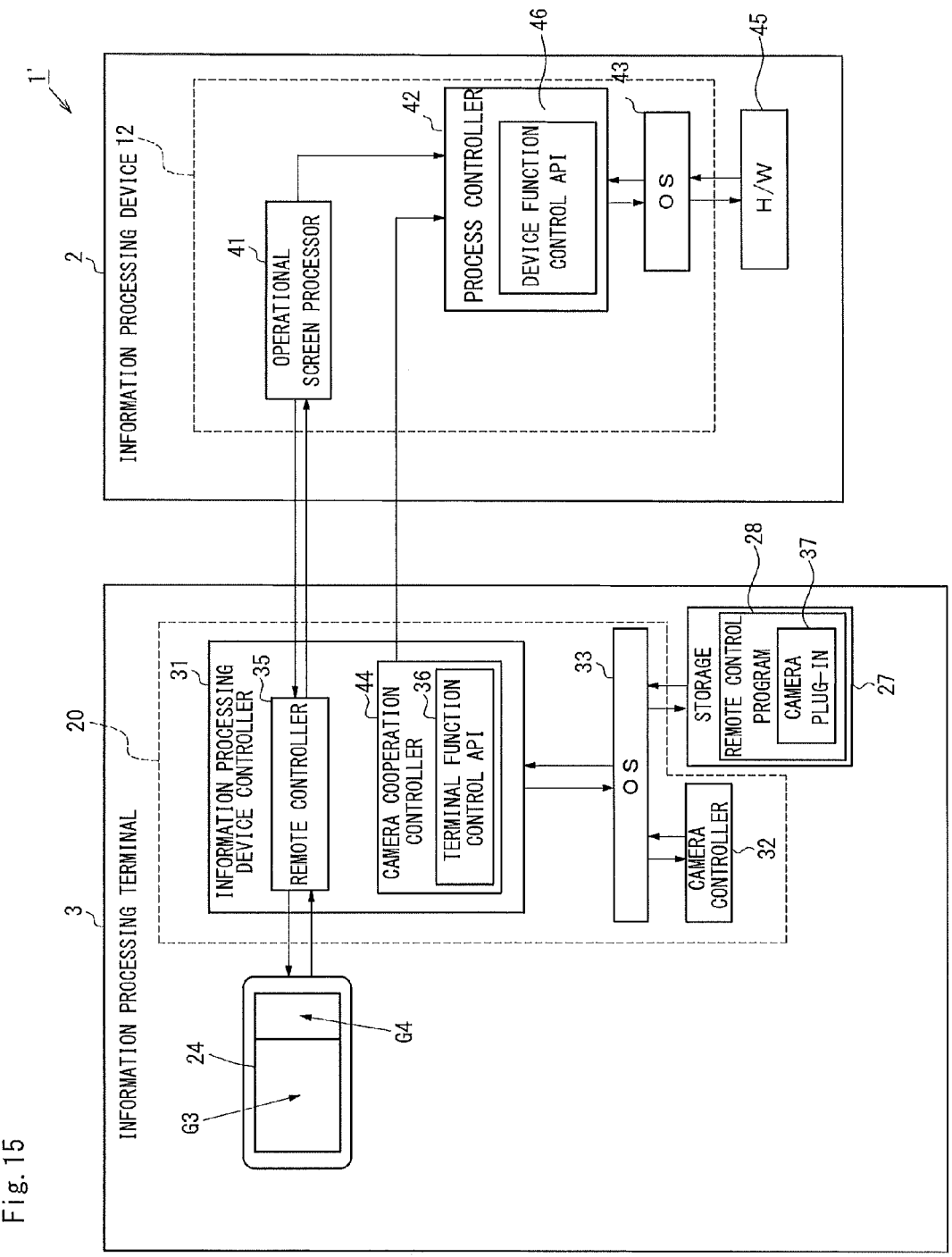
FIG. 15 is a block diagram showing a structure of making the information processing terminal and the information processing device work cooperatively in a fourth preferred embodiment.

A fourth preferred embodiment of the present invention is described next. FIG. 15 is a block diagram showing a structure of making the information processing terminal 3 and the information processing device 2 work cooperatively in the fourth preferred embodiment.

In the first preferred embodiment, after the remote controller 35 of the information processing terminal 3 is actuated, in response to action on the camera button K1, the remote controller 35 reads the camera plug-in 37 from the storage 27 of the information processing terminal 3 and transmits the camera plug-in 37 to the information processing device 2. Then, the CPU 15 of the information processing device 2 executes the camera plug-in 37, thereby realizing the camera cooperation controller 44 in the information processing device 2.

The fourth preferred embodiment differs from the first preferred embodiment in that, after being actuated, the remote controller 35 is triggered by action on the camera button K1 to make the CPU 21 of the same terminal (information processing terminal 3) read and execute the camera plug-in 37 from the storage 27 of the same terminal (information processing terminal 3), thereby realizing the camera cooperation controller 44 in the information processing terminal 3. In this case, the CPU 21 of the information processing terminal 3 functions as a program execution unit.

The terminal function control API 36 is therefore integrated in advance into the camera plug-in 37 in the fourth preferred embodiment. Accordingly, the terminal function control API 36 is provided inside the camera cooperation controller 44. Like in the first preferred embodiment, screens to be displayed in the fourth preferred embodiment are the same as those shown in FIGS. 6A and 6B, and FIGS. 8A to 8C.

Figure 16:
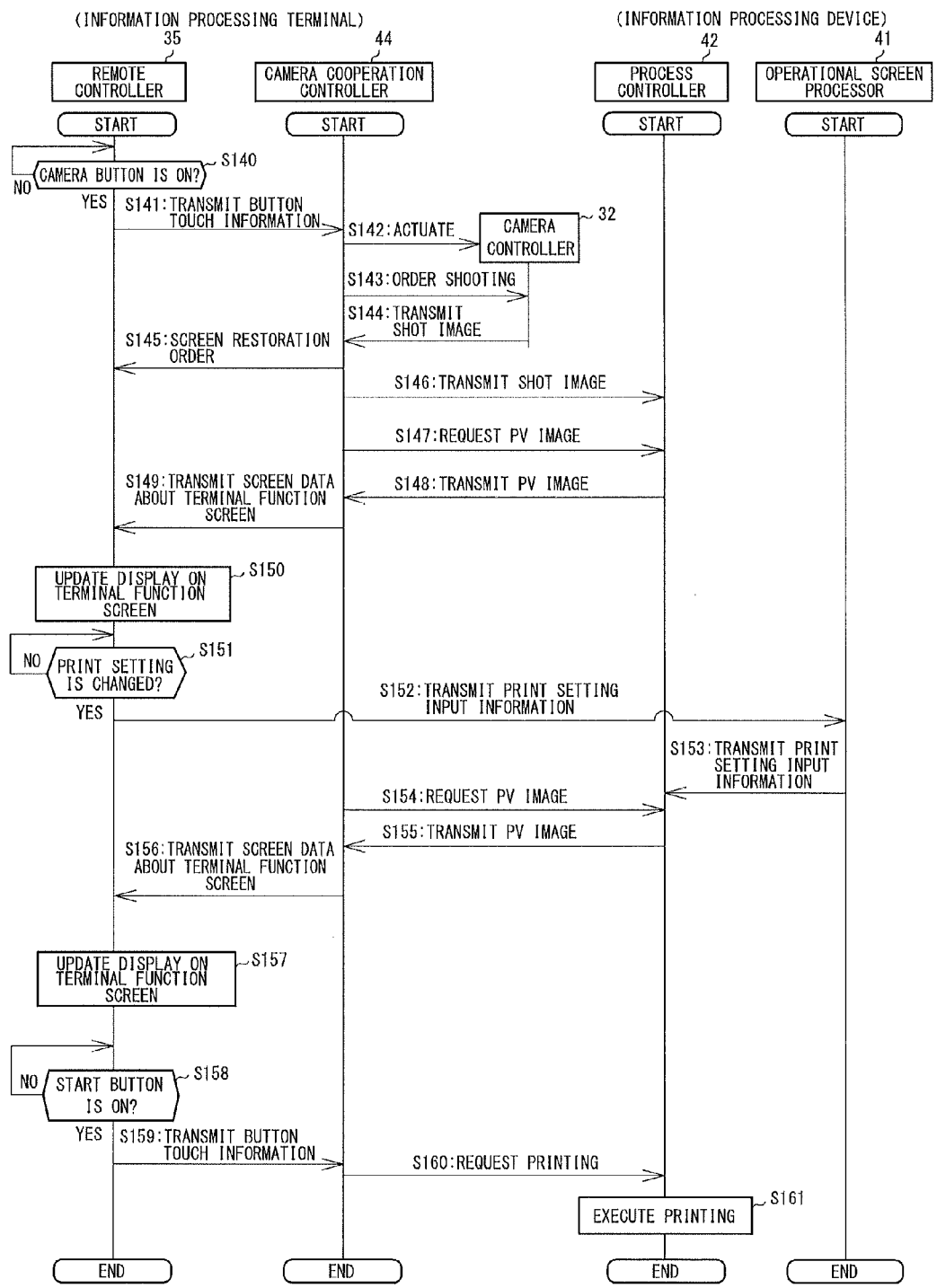
FIG. 16 is a flowchart explaining process performed in the fourth preferred embodiment in response to action on the camera button on the entire operational screen of FIG. 6B.

The following describes process performed in the fourth preferred embodiment in response to action on the camera button K1 on the entire operational screen G2 of FIG. 6B. FIG. 16 is a flowchart explaining this process.

As shown in FIG. 16, if the camera button K1 is touched (becomes ON) (YES of step S140), the remote controller 35 transmits button touch information indicating that the camera button K1 was touched to the camera cooperation controller 44 (step S141). The terminal function control API 36 in the camera cooperation controller 44 actuates the camera controller 32 through the OS 33 (step S142). After being actuated, the camera controller 32 displays the camera function screen G5 on the display unit 24 (see FIG. 8A).

If the shooting button K2 is touched on the camera function screen G5, the terminal function control API 36 transmits an order for shooting to the camera controller 32 (step S143). The camera controller 32 makes the shooting unit 26 shoot an image to be stored. Then, the camera controller 32 stores the shot image into a certain recording medium and transmits the shot image to the camera cooperation controller 44 (step S144). After receiving the shot image, the camera cooperation controller 44 transmits an order (screen restoration order) to the remote controller 35 to display the entire operational screen G2 with the remote operational screen G3 and the terminal function screen G4 again on the display unit 24 of the information processing terminal 3 (to restore a screen on the display unit 24) (step S145).

The camera cooperation controller 44 transmits image data about the shot image to the process controller 42 (step S146). Further, the camera cooperation controller 44 requests a preview image from the process controller 142 (step S147). In response to this request, the process controller 42 transmits image data about the preview image relating to the shot image to the camera cooperation controller 44 (step S148).

After receiving the image data about the preview image, the camera cooperation controller 44 generates the terminal function screen G4 containing the preview image PV and the start button K4 and transmits screen data about the terminal function screen G4 to the remote controller 35 (step S149). After receiving the screen data about the terminal function screen G4, the remote controller 35 updates the terminal function screen G4 (step S150; see FIG. 8B).

If a user changes print setting (adjusts a print image quality) thereafter on the remote operational screen G3 (YES of step S151), the remote controller 35 transmits to the operational screen processor 41 print setting input information indicating the adjustment of a print image quality thereby input (step S152). After receiving the print setting input information, the operational screen processor 41 transmits the received print setting input information to the process controller 42 (step S153).

Like in the first preferred embodiment, after receiving the print setting input information, the process controller 42 receives a request for a preview image from the camera cooperation controller 44 (step S154). In response, the process controller 42 transmits to the camera cooperation controller 44 a preview image PV generated based on the adjustment of a print image quality indicated by the print setting input information (step S155). After receiving the preview image PV, the camera cooperation controller 44 generates the terminal function screen G4 containing the received preview image PV and the start button K4, and transmits screen data about the terminal function screen G4 to the remote controller 35 (step S156). After receiving the screen data about the terminal function screen G4, the remote controller 35 updates the terminal function screen G4 in the terminal function screen display region R2 based on the received screen data (step S157; see FIG. 8C).

If the start button K4 is touched (YES of step S158) after step S157, the remote controller 35 transmits button touch information indicating that the start button K4 was touched to the camera cooperation controller 44 (step S159). After receiving the button touch information, the camera cooperation controller 44 requests the process controller 42 for printing (step S160). In response to the request for printing, the process controller 42 makes the H/W 45 make printing action (step S161).

Figure 17:
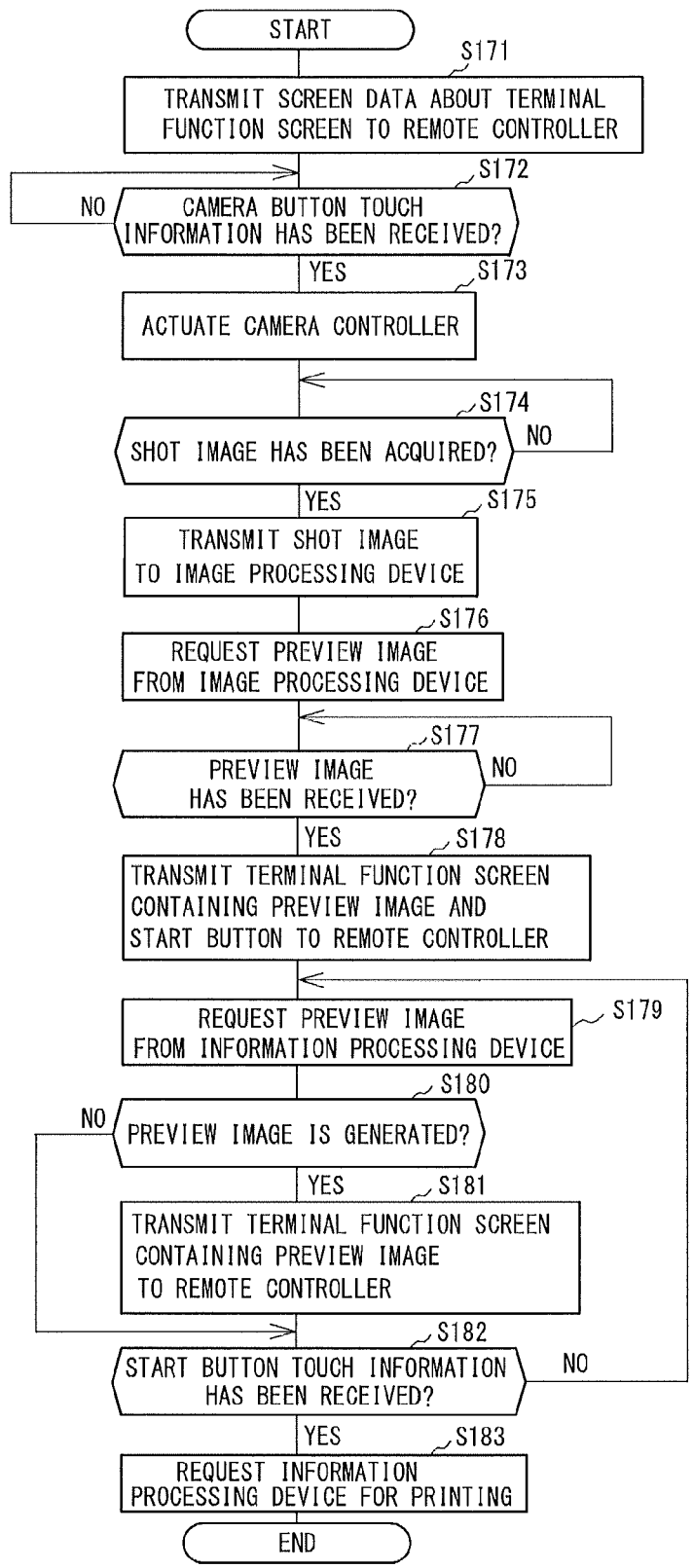
FIG. 17 is a flowchart explaining process performed by the camera cooperation controller and extracted from the processes shown in FIGS. 5 and 16.

FIG. 17 is a flowchart explaining process performed by the camera cooperation controller 44 and extracted from the processes shown in FIGS. 5 and 16.

As shown in FIG. 17, after being actuated, the camera cooperation controller 44 transmits screen data about the terminal function screen G4 to the remote controller 35 (step S171). Then, the camera cooperation controller 44 determines whether the camera button K1 was touched (step S172). If determining that the camera button K1 was touched (YES of step S172), the camera cooperation controller 44 actuates the camera controller 32 (step S173).

If a user orders shooting and in response to which image data about a shot image is received from the camera controller 32 (YES of step S174), the camera cooperation controller 44 transmits the received image data to the information processing device 2 (step S175). Further, the camera cooperation controller 44 requests a preview image from the information processing device 2 (process controller 42) (step S176).

If receiving a preview image from the information processing device 2 (YES of step S177), the camera cooperation controller 44 transmits to the remote controller 35 screen data about the terminal function screen G4 containing the preview image PV and the start button K4 (step S178).

If time has come to request a preview image from the process controller 42, the camera cooperation controller 44 requests the preview image from the information processing device 2 (process controller 42) (step S179). If a new preview image is generated by the process controller 42 (YES of step S180), the camera cooperation controller 44 receives the new preview image from the process controller 42, generates the terminal function screen G4 containing this preview image, and transmits screen data about the terminal function screen G4 to the remote controller 35 (step S181). If a new preview image is not generated by the process controller 42 (NO of step S180), the camera cooperation controller 44 bypasses step S181.

Next, the camera cooperation controller 44 determines whether button touch information about the start button K4 has been received (step S182). If determining that this button touch information has not been received (NO of step S182), the camera cooperation controller 44 returns to step S179. If determining that this button touch information has been received (YES of step S182), the camera cooperation controller 44 requests the information processing device 2 (process controller 42) for printing (step S183).

In the fourth preferred embodiment, the camera cooperation controller 44 is mounted on the information processing terminal 3 and the fourth preferred embodiment achieves the same effect as that of the first preferred embodiment. Particularly, in the fourth preferred embodiment, mounting the camera cooperation controller 44 not on the information processing device 2 but on the information processing terminal 3 reduces a processing load on the information processing device 2 as the information processing device 2 becomes free from the process performed by the camera cooperation controller 44. Thus, if the information processing device 2 is shared among multiple users (multiple information processing terminals 3) and is working in cooperation with one of the information processing terminals 3, the information processing device 2 can execute a job (such as a print job) promptly received from a different information processing terminal 3.

Unlike the first preferred embodiment, the fourth preferred embodiment does not require transmission of the camera plug-in 37 to the information processing device 2. In this regard, compared to the first preferred embodiment, the fourth preferred embodiment can shorten a time to elapse before the entire operational screen G2 of FIG. 6B is displayed on the display unit 24 of the information processing terminal 3.

According to the invention disclosed in each of the aforementioned preferred embodiments, in response to user's operation on the operational input unit, the remote controller actuates the cooperation controller that functions to make the information processing device and the terminal function controller work cooperatively. The cooperation controller functions to display the cooperation operational screen on at least part of the display unit that is used for making the information processing device and the terminal function controller work cooperatively. Thus, a function specific to the information processing terminal and the remote control function are not required to be started individually by respective operations.

The cooperation controller makes the information processing device and the terminal function controller work cooperatively. This eliminates the need for operation of transmitting data processed by the terminal function controller to the information processing device, for example.

Eliminating labor involved in the aforementioned operations for starting the functions individually and the aforementioned operation for transmitting data makes it possible to form an information processing system with favorable convenience.

The present invention is not limited to the preferred embodiments described above but is applicable to various modifications. Some of the modifications are described below.

(1) In the first preferred embodiment, for example, a camera function is described as an example of a function specific to the information processing terminal 3. However, the specific function is not limited to a camera function. Other examples of the specific function that can be mounted on the information processing terminal 3 include a map display function of searching a geographic position and displaying a map covering the searched geographic position and its surrounding, a GPS (global positioning system) function of detecting a current position of the information processing terminal 3, and a voice input function of giving an order for action to the information processing terminal 3 and the like by means of voice input.

The map display function (map display controller) mounted on the information processing terminal 3 may be applied for example in a situation where a map covering a certain range including a geographic position searched by the map display function is printed by the information processing device 2. The technical idea of the present invention is further applicable to such a situation.

Specifically, a map display plug-in is provided in the information processing terminal 3 that makes the map display controller or the remote controller 35 of the information processing terminal 3 work in cooperation with the process controller 42 of the information processing device 2. If a user gives an order to start the remote control program 28, the map display plug-in is executed for example by the CPU 15 of the information processing device 2 to actuate a map display cooperation controller. After being actuated, the map display cooperation controller displays the terminal function screen G4 on the display unit 24 that is used for making the map display controller and the information processing device 2 work cooperatively. The map display cooperation controller may be configured to make the remote controller 35 of the information processing terminal 3 and the process controller 42 of the information processing device 2 work cooperatively, or make the map display controller of the information processing terminal 3 and the process controller 42 work cooperatively.

The GPS function (GPS controller) mounted on the information processing terminal 3 may be applied for example in a situation where a map covering a certain range including a current position of the information processing terminal 3 detected by the GPS function is printed by the information processing device 2. The technical idea of the present invention is further applicable to such a situation.

Specifically, a GPS plug-in is provided in the information processing terminal 3 that makes the GPS controller or the remote controller 35 of the information processing terminal 3 work in cooperation with the process controller 42 of the information processing device 2. If a user gives an order to start the remote control program 28, the GPS plug-in is executed for example by the CPU 15 of the information processing device 2 to actuate a GPS cooperation controller. After being actuated, the GPS cooperation controller displays the terminal function screen G4 on the display unit 24 that is used for making the GPS controller and the information processing device 2 work cooperatively. The GPS cooperation controller may be configured to make the remote controller 35 of the information processing terminal 3 and the process controller 42 of the information processing device 2 work cooperatively, or make the GPS controller of the information processing terminal 3 and the process controller 42 work cooperatively.

The voice input function (voice input controller) mounted on the information processing terminal 3 may be applied for example in a situation where, in response to input of a voice announcing a job, the information processing device 2 makes a print based on the voice announcing the job. The technical idea of the present invention is further applicable to such a situation.

Specifically, a voice input plug-in is provided in the information processing terminal 3 that makes the voice input controller or the remote controller 35 of the information processing terminal 3 work in cooperation with the process controller 42 of the information processing device 2. If a user gives an order to start the remote control program 28, the voice input plug-in is executed for example by the CPU 15 of the information processing device 2 to actuate a voice input cooperation controller. After being actuated, the voice input cooperation controller displays the terminal function screen G4 on the display unit 24 that is used for making the voice input controller and the information processing device 2 work cooperatively. The voice input cooperation controller may be configured to make the remote controller 35 of the information processing terminal 3 and the process controller 42 of the information processing device 2 work cooperatively, or make the voice input controller of the information processing terminal 3 and the process controller 42 work cooperatively.

(2) In the first preferred embodiment, for example, after receiving a preview image PV from the process controller 42, the camera cooperation controller 44 generates the terminal function screen G4 containing the received preview image PV, and transmits screen data about the terminal function screen G4 to the remote controller 35 for example in step S30 of the flowchart of FIG. 7, to which the present invention is not intended to be limited. As an example, if the remote controller 35 is capable of updating only the preview image PV in the terminal function screen G4, the camera cooperation controller 44 may transmit image data about a preview image PV to the remote controller 35 after receiving the preview image PV from the process controller 42.

What is claimed is:

1. An information processing terminal capable of communicating with an information processing device with an operational panel on which setting on a job and an order to execute the job are accepted, the information processing terminal comprising:

a display unit on which various types of information are displayed;

an operational input unit to accept user's operation;

a remote controller to remote control the information processing device by acquiring an operational screen displayed on the operational panel from the information processing device and displaying the operational screen on the display unit, and by transmitting operational information resulting from user's operation to the information processing device while the operational screen is displayed on the display unit;

a terminal function controller to control a specific function mounted on the information processing terminal; and a storage storing a program that functions as a cooperation controller to make the information processing device and the terminal function controller work cooperatively, wherein the remote controller actuates the cooperation controller by starting the program based on user's operation on the operational input unit, and in response to acquisition of a cooperation operational screen from the cooperation controller, the remote controller displays the cooperation operational screen on at least part of the display unit, the cooperation operational screen being used for making the information processing device and the terminal function controller work cooperatively.

2. The information processing terminal according to claim 1, wherein the remote controller starts the program in the information processing device by transmitting the program to the information processing device.

3. The information processing terminal according to claim 1, comprising a program execution unit to execute the program, wherein the remote controller makes the program execution unit execute the program.

4. The information processing terminal according to claim 1, wherein the terminal function controller starts the specific function based on an order from the cooperation controller and displays a function screen on the display unit, the function screen being used for operating the specific function.

5. The information processing terminal according to claim 4, wherein the terminal function controller controls the specific function based on user's operation on the function screen and transmits an image acquired by the specific function to the cooperation controller, and the remote controller acquires a processed image from the cooperation controller and displays the processed image on the cooperation operational screen on the display unit, the processed image resulting from image process performed on the image in the information processing device, the image process being set on the operational screen.

6. The information processing terminal according to claim 5, wherein the specific function is a shooting function, and the processed image is a preview image resulting from image process performed on an image shot by the shooting function, the image process being set on the operational screen.

7. The information processing terminal according to claim 1, wherein the cooperation controller displays a shortcut button on the cooperation operational screen on the display unit, the shortcut button permitting designation of one adjustment or collective designation of multiple adjustments capable of being selected on the operational screen, and in response to action made on the shortcut button, an operational screen indicating the action is transmitted from the information processing device to the remote controller and the remote controller displays this operational screen on the display unit.

8. The information processing terminal according to claim 1, wherein the remote controller displays the operational screen acquired from the information processing device and the cooperation operational screen acquired from the cooperation controller side by side on the display unit.

9. An information processing device capable of communicating with an information processing terminal, the information processing device comprising:

an image processor to execute a job relating to image process;

an operational panel on which an operational screen relating to setting on a job to be executed by the image processor is displayed and on which manual input by a user is accepted;

a remote operation accepting unit to transmit an operational screen displayed on the operational panel to the information processing terminal based on a request for a screen received from the information processing terminal, make setting on a job in response to receipt of operational information indicating operation on the operational screen from the information processing terminal, and update the operational screen to be transmitted to the information processing terminal; and a program execution unit to function as a cooperation controller, the cooperation controller becoming functional to make, a specific function and the image processor work cooperatively by starting a program when the program is received from the information processing terminal, the program being used for controlling the specific function mounted on the information processing terminal, wherein the cooperation controller generates a cooperation operational screen on which the specific function is operated and transmits the cooperation operational screen to the information processing terminal, and in response to receipt of operational information indicating operation on the cooperation operational screen from the information processing terminal, the cooperation controller starts the specific function in the information processing terminal.

10. The information processing device according to claim 9, wherein if receiving an image acquired by the specific function from the information processing terminal, the cooperation controller outputs the image to the image processor, acquires a preview image from the image processor, and transmits the preview image to the information processing terminal, the preview image reflecting the setting on the job.

11. An information processing system comprising an information processing device and an information processing terminal capable of communicating with the information processing device, the information processing device including an operational panel on which setting on a job and an order to execute the job are accepted, wherein the information processing terminal includes:

a display unit on which various types of information are displayed;

an operational input unit to accept user's operation;

a remote controller to remote control the information processing device by acquiring an operational screen displayed on the operational panel from the information processing device and displaying the operational screen on the display unit, and by transmitting operational information resulting from user's operation to the information processing device while the operational screen is displayed on the display unit;

a terminal function controller to control a specific function mounted on the information processing terminal; and a storage storing a program that functions as a cooperation controller to make the information processing device and the terminal function controller work cooperatively, the remote controller transmits the program to the information processing device based on user's operation on the operational input unit, the information processing device actuates the cooperation controller by starting the program in response to receipt of the program from the information processing terminal, the cooperation controller generates a cooperation operational screen and transmits the cooperation operational screen to the information processing terminal, and in response to receipt of operational information indicating operation on the cooperation operational screen from the information processing terminal, the cooperation controller transmits an order to the information processing terminal to start the specific function in the information processing terminal, the cooperation operational screen being used for making the information processing device and the terminal function controller work cooperatively, and the terminal function controller starts the specific function in the information processing terminal based on the order transmitted from the cooperation controller.

12. A non-transitory computer-readable recording medium storing a control program to bring an information processing terminal into operation, the information processing terminal being capable of communicating with an information processing device with an operational panel on which setting on a job and an order to execute the job are accepted, the information processing terminal including a display unit on which various types of information are displayed, an operational input unit to accept user's operation, and a storage storing a cooperation program, wherein the control program makes the information processing terminal function as:

a remote controller to remote control the information processing device by acquiring an operational screen displayed on the operational panel from the information processing device and displaying the operational screen on the display unit, and by transmitting operational information resulting from user's operation to the information processing device while the operational screen is displayed on the display unit; and a terminal function controller to control a specific function mounted on the information processing terminal, and the remote controller actuates a cooperation controller by starting the cooperation program stored in the storage based on user's operation on the operational input unit, and in response to acquisition of a cooperation operational screen from the cooperation controller, the remote controller displays the cooperation operational screen on at least part of the display unit, the cooperation program functioning as the cooperation controller to make the information processing device and the terminal function controller work cooperatively, the cooperation operational screen being used for making the information processing device and the terminal function controller work cooperatively.

13. A non-transitory computer-readable recording medium storing a control program to bring an information processing device into operation, the information processing device being capable of communicating with an information processing terminal and including an operational panel on which an operational screen relating to setting on a job is displayed and on which manual input by a user is accepted, wherein the control program makes the information processing device function as:

an image processor to execute a job relating to image process;

a remote operation accepting unit to transmit an operational screen displayed on the operational panel to the information processing terminal based on a request for a screen received from the information processing terminal, make setting on a job in response to receipt of operational information indicating operation on the operational screen from the information processing terminal, and update the operational screen to be transmitted to the information processing terminal; and a program execution unit to function as a cooperation controller, the cooperation controller becoming functional to start a specific function by starting a cooperation program when the cooperation program is received from the information processing terminal, the cooperation program being used for controlling the specific function mounted on the information processing terminal.

* * * * *